(12) United States Patent
Hassan et al.

(10) Patent No.: US 11,650,332 B2
(45) Date of Patent: May 16, 2023

(54) DISTRIBUTED LOCATION DETERMINATION IN WIRELESS NETWORKS

(71) Applicant: Microsoft Technology Licensing, LLC, Redmond, WA (US)

(72) Inventors: Amer Aref Hassan, Kirkland, WA (US); Russell Andrew Penar, Highlands Ranch, CO (US); Mahendra D. Sekaran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 17/496,281

(22) Filed: Oct. 7, 2021

(65) Prior Publication Data
US 2022/0026585 A1 Jan. 27, 2022

Related U.S. Application Data

(63) Continuation of application No. 16/677,116, filed on Nov. 7, 2019, now Pat. No. 11,163,071, which is a
(Continued)

(51) Int. Cl.
*G01S 19/46* (2010.01)
*H04B 17/318* (2015.01)
(Continued)

(52) U.S. Cl.
CPC ............ *G01S 19/46* (2013.01); *G06F 3/0481* (2013.01); *H04B 17/318* (2015.01);
(Continued)

(58) Field of Classification Search
CPC .......... G01S 19/46; G01S 5/0081; G01S 5/02; G01S 5/0242; G06F 3/0481;
(Continued)

(56) References Cited

U.S. PATENT DOCUMENTS 9,363,785 B2 * 6/2016 Alizadeh-Shabdiz .............. H04W 88/06
2007/0121560 A1 5/2007 Edge
(Continued)

FOREIGN PATENT DOCUMENTS

CN 101346638 A 1/2009

OTHER PUBLICATIONS

"Notice of Allowance Issued in European Patent Application No. 19736858.2", dated Aug. 19, 2022, 2 Pages.
(Continued)

*Primary Examiner* — Fred A Casca
(74) *Attorney, Agent, or Firm* — Schwegman Lundberg & Woessner, P.A.

(57) ABSTRACT

In some embodiments, a location of a mobile terminal is determined by obtaining a location of a first access point (AP), receiving a visibility indication indicating that a second AP received a signal from the first AP or the first AP received a signal from the second AP, determining a location of the second AP based on the received visibility indication and the location of the first AP, determining a location of the mobile terminal in communication with the second AP based on the determined location of the second AP, and transmitting a message indicating the location of the mobile terminal on a digital communication network.

20 Claims, 23 Drawing Sheets

Related U.S. Application Data continuation-in-part of application No. 16/008,893, filed on Jun. 14, 2018, now Pat. No. 10,531,423.

(51) Int. Cl.
| | |
|---|---|
| *H04W 4/90* | (2018.01) |
| *G06F 3/0481* | (2022.01) |
| *H04W 4/029* | (2018.01) |
| *H04W 88/08* | (2009.01) |
| *H04W 88/02* | (2009.01) |

(52) U.S. Cl.
CPC ............ *H04W 4/029* (2018.02); *H04W 4/90* (2018.02); *H04W 88/02* (2013.01); *H04W 88/08* (2013.01)

(58) Field of Classification Search
CPC ...... H04B 17/318; H04W 4/029; H04W 4/90; H04W 88/02; H04W 88/08; H04W 64/00
See application file for complete search history.

(56) References Cited

U.S. PATENT DOCUMENTS

| | | |
|---|---|---|
| 2013/0143584 A1 | 6/2013 | Mechaley, Jr. |
| 2013/0260781 A1* | 10/2013 | Un ..................... H04W 64/00 455/456.1 |
| 2014/0087763 A1 | 3/2014 | Gao et al. |

OTHER PUBLICATIONS

"Office Action Issued in Indian Patent Application No. 202047056821", dated Sep. 21, 2022, 5 Pages.

"Notice of Allowance Issued in European Patent Application No. 19736858.2", dated Apr. 13, 2022, 7 Pages.

"First Office Action and Search Report Issued in Chinese Patent Application No. 201980039858.X", dated Oct. 27, 2022, 12 Pages.

* cited by examiner

```xml
<?xml version="1.0" encoding="UTF-8"?>
<presence xmlns="urn:ietf:params:ns:pidf"
xmlns:gp="urn:ietf:params:xml:ns:pidf:geopriv10"
entity="pres:sample@example.com">
<tuple id="0515">
<status>
<gp:geopriv>
 <gp:location-info>
 <!--location information is inserted here-->
 </gp:location-info>
 <gp:usage-rules>        905
</gp:retransmission-allowed>
no
 </gp:retransmission-allowed>
 <gp:retention-expiry>
2017-08-10T09:00:10+02:00
</gp:retention-expiry>
 </gp:usage-rules>
 </gp:geopriv>
</status>
<timestamp>
2017-08-10T08:31:00+02:00
</timestamp>
</tuple>
 </presence>
```

DISTRIBUTED LOCATION DETERMINATION IN WIRELESS NETWORKS

CROSS REFERENCE TO RELATED APPLICATIONS

This application is a continuation of U.S. patent application Ser. No. 16/677,116, filed Nov. 7, 2019, which is a continuation-in-part of U.S. patent application Ser. No. 16/008,893, filed Jun. 14, 2018, now U.S. Pat. No. 10,531,423, and entitled "Distributed Location Determination in Wireless Networks." The contents of both these applications are incorporated herein by reference in their entireties.

BACKGROUND

Use of digital telephony has become pervasive during the past decade. As the use of digital telephony expands, users expect to have all of the functionality available to them on previous analog based devices, and of course also receive the benefits associated with integration of a digital telephone with other digital networks, such as the internet. As digital telephones have become increasing mobile, it has become more challenging to determine a location of a digital telephone when a call is initiated. Some digital telephone devices include built in GPS positioning systems, and position information derived from these systems may be included in digital information provided with a call initiation request, such as a session initiation protocol (SIP) invite message. Other digital telephony platforms, such as laptop or desktop computers, may not include integrated positioning systems, such as a GPS receiver. As such, calls placed from these devices may be unable to determine their position. This technical problem may become more acute when these digital telephony platforms are used to place emergency calls. Many government agencies are requiring location information to be included with emergency calls. In some cases, emergency calls may be rejected unless the location information for an originator of the call is sufficiently precise. Therefore, improved methods of obtaining location information for callers using a digital telephone are desired.

The approaches described in this background section are approaches that could be pursued, but not necessarily approaches that have been previously conceived or pursued. Therefore, unless otherwise indicated, it should not be assumed that any of the approaches described in this background section qualify as prior art merely by virtue of their inclusion in this background section.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 9 shows an example PIDF-Lo file.

DETAILED DESCRIPTION

Figure 1:
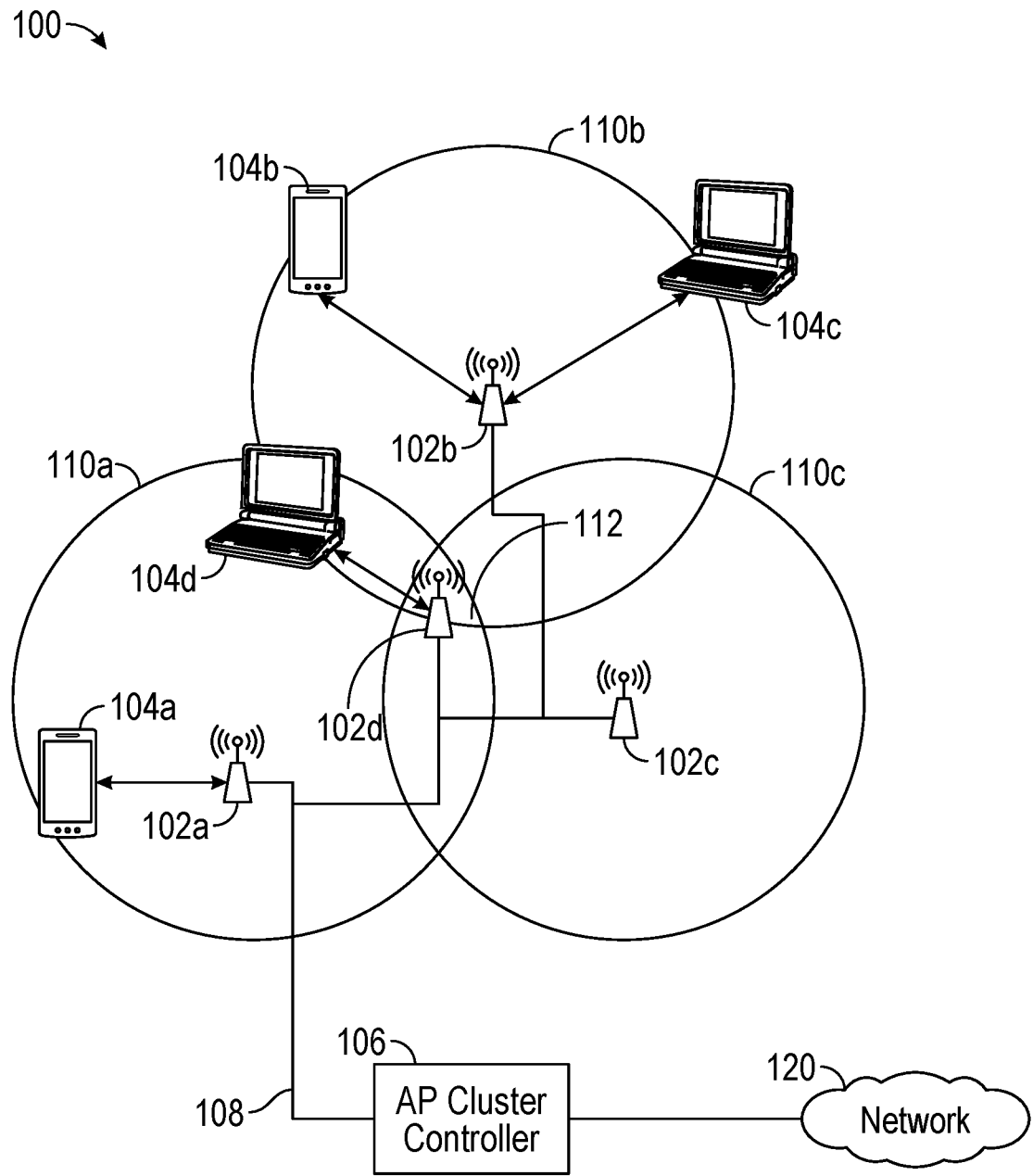
FIG. 1 is an overview diagram of a wireless network implementing at least some of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As described above, a technical problem exists in that location information for stations originating messages may not always be available or may not always be as accurate as desired. While many mobile devices are now built to include a positioning receiver, such as a global positioning system (GPS) receiver, other devices, such as older mobile devices, tablets, laptops, and desktop computers may not include positioning equipment. Furthermore, in some environments, satellite positioning systems may be unable to identify a location. For example, calls made from large buildings or underground facilities may be unable to include positioning information, because radio signals used to determine position may not be received when the caller is located in these locations.

This technical problem may become more acute when a station originates a message in an attempt to place an emergency call in a digital telephony environment in which the location of the caller cannot be electronically determined by the calling digital telephony device. To address this technical problem, the disclosed embodiments provide a technical solution that obtains location indications for the originating station from other devices in a wireless network. For example, in some cases, a location of an access point communicating with the originating station may be known. The location of the access point may be used as an approximation for the location of the originating station in some aspects.

In some other aspects, signals from the originating station may be received by one or more other stations, including access point stations and/or other stations that are not access points. The strength of the signals, along with any known locations of the receiving stations, may be used by some of the disclosed embodiments to determine a position estimate for the originating station. In some aspects, if the position estimate's accuracy is above a threshold, the position estimate may be used as the location in the message. If an accurate position estimate cannot be obtained via signals generated by the originating station, or by any positioning equipment included in the originating device itself, some of the disclosed aspects may generate a prompt and cause it to be displayed on the originating station. The prompt may request a user of the originating station to provide input indicating their position. After this position information is provided, processing of the message may proceed using the provided position information. For example, if the message requests initiation of an emergency call, the location information may be forwarded to a digital telephony infrastructure configured to support emergency calling. For example, the location information and/or the original message may be forwarded to a public safety answering point (PSAP) in some aspects.

Some aspects may provide for reduced configuration burden for wireless networks. For example, some wireless networks may include a plurality of access points, which may be in communication with a central access point controller in some aspects. Configuration of the wireless network may be made available via the access point cluster controller. For example, the access point cluster controller may provide a user interface, such as a web based user interface, that allows for manual configuration of location information for one or more access points that it controls. After location information for a particular access point is manually configured via the user interface, the location information may be downloaded to the appropriate access point, so an access point is aware of its location. In some aspects, the access points may be equipped with a positioning receiver, such as a GPS receiver, and may therefore be able to independently establish their position. These independently established positions may then be uploaded from the AP to the AP cluster controller. In some other cases, a location of an access point may be available via a third party service. For example, some internet based services provide location information for access points as observed when particular geographical areas are scanned, for example, by a vehicle driving through the area and collecting information on visible access points. This information may be available via an Internet service. In some cases, manual configuration of location information for most or all of the access points controlled by an AP cluster controller may be burdensome to administrators. Furthermore, the location information for an AP may change, for example, as the network configuration changes, and thus, maintaining the location information manually may also present a burden. Access points with inaccurate location information may present particular problems.

To solve this technical problem, some embodiments provide for the configuration of location information for only a portion of access points managed by an AP cluster controller. The location information available for the portion of access points may then be used to approximate locations for other access points. For example, in some aspects, as described below, access points and/or non-AP stations may report which other devices, and in particular, which access points, are visible from their locations. The disclosed embodiments may then use a variety of techniques to derive location approximations for any access points lacking same. For example, in some aspects a clustering approach may be used to derive location estimates for some access points based on locations of other access points. For example, if a first access point is visible when a second access point is visible, a location of the first access point may indicate a location of the second access point. In some embodiments, the locations of the first access point and second access point are set to be equivalent to each other based on the common visibility of the two access points.

Similarly, if the second access point is also visible with a third access point, a location of the third access point may indicate the location of the second access point. In some aspects, one or more of K-means clustering, EM clustering, centroid based clustering, distribution-based clustering, density based clustering, or hierarchical clustering may be used to define a location estimate for the second access point given visibility information of the second access point with other access points and the locations of these other access points.

Some embodiments set location information for access points within a common cluster or group to indicate identical locations. For example, an AP cluster controller may control access points distributed throughout two or more different buildings. Because a portion of the controlled access points are within a single building, each access point in a building may be visible to at least some of the other access points within the building. Some of the disclosed embodiments cluster this set of access points into a single cluster based on their mutual visibility to each other. Some aspects cluster the set of access points based on signal strengths associated with this visibility, and in some aspects, based on a relation to the signal strengths to one or more strength thresholds. In some embodiments, a location of one or more access points within the cluster is obtained. For example, a location of one or more APs within the cluster is statically configured in some embodiments. Alternatively, in some embodiments, one or more of the access points within the cluster includes location determination equipment, such as a satellite position receiver (e.g. GPS receiver), such that the AP can determine its location. From these one or more known locations of one or more access points within a cluster or group of APs, locations of other APs within the cluster or group are determined or set. In some aspects, a trilateration method of location determination may be used.

FIG. 1 is an overview diagram of a wireless network 100 implementing at least some of the disclosed embodiments. FIG. 1 shows four access points 102*a*-*d*. FIG. 1 also shows four non-AP stations 104a-d. Station 104a is associated with access point 102a, stations 104b and 104c are associated with access point 102b, and station 104d is associated with access point 102d. Each of the access points 102a-d is in communication with an access point cluster controller 106. In the illustrated embodiment of FIG. 1, the access point cluster controller 106 communicates with the four access points 102a-d via a backhaul network 108. The AP cluster controller 106 may also communicate with a network 120. For example, the AP cluster controller may forward calls made by devices on the network, such as any of the stations 104a-d, to a destination or called device (not shown) via the network 120.

In some of the disclosed aspects, a physical location may be known for some of the access points 102a-d but not all of the access points 102a-d. This may, in some aspects, ease a configuration burden associated with administering the AP cluster controller 106 and the APs 102a-d. The wireless network 100 may also support emergency calling from one or more of the stations 104a-d. Some messages generated by a station may be augmented to include location information for a device or station originating the message. This location information may be particularly useful when a device or station is attempting to establish a telephony call in a digital environment. With respect to emergency calls, some jurisdictions may require location information, and in some cases, the location information must be of a particular level of accuracy. When location information for the station originating the message, and/or location information for an access point servicing the station is not known, a location of the originating station may also be uncertain.

In the illustration of the wireless network 100 of FIG. 1, the station 104d may originate a message. The message may be transmitted by the station 104d via the access point 102d. In some aspects, the message may initiate or otherwise maintain a digital telephony call, such as an emergency call. In some aspects, the message may be a SIP invite message. In some other aspects, the message may be a data packet. While the AP controller 106 may know the physical locations of APs 102a-c, the physical location of AP 102d may be unknown. Furthermore, the station 104d may not be equipped with a GPS receiver or other positioning device. Thus, the emergency call initiated by the station 104d may not include location information, or at least not include location information of sufficient accuracy to satisfy certain emergency call requirements.

Thus, some embodiments of this disclosure may determine a location estimate for the AP 104d based on information received from the wireless network 100. Also shown in FIG. 1 are detection ranges 110a-c for the respective access points 102a-c. The detection ranges 110a-c represent a geographic area within which a signal from the respective access point 102a-c may be detected by other devices. Some of the disclosed embodiments may receive, from at least a portion of the access points 102a-d, a list of other access points from which signals have been detected. For example, none of access points 102a-c is within a detection range of any other access point, except perhaps the detection range of AP 102d, which is not shown in FIG. 1 to improve clarity. Access point 102d is within the detection range of each of APs 102a-c. Thus, AP 102d may send a list to the AP cluster controller 106 identifying each of the APs 102a-c.

The AP cluster controller 106 may then use established physical locations of one or more of the APs 102a-c to estimate a physical location of the AP 102d. For example, if a location of each of the APs 102a-c is known, the AP cluster controller 106 may use triangulation to estimate the physical location of the AP 102d. An estimated position of the AP 102d is illustrated in FIG. 1 as a region where the detection ranges 110a-c of APs 102a-c intersect, identified as area 112. Once a location estimate for the AP 102d has been determined, the AP cluster controller 106 may use the location estimate as a location estimate for the station 104d when processing a message originated by the originating station 104d, such as a message requesting an emergency call.

While FIG. 1 shows that the stations 104a-d communicate with the access points 102a-d, in some aspects, one or more of the stations 104a-d may communicate directly with the AP cluster controller 106. For example, in some aspects, the AP cluster controller may include a wireless radio capable of communicating using protocols similar to or the same as those used for communication with one or more of the access points 102a-d. In some aspects, one or more of the stations may be dual connectivity capable, in that they may be configured to maintain associations with multiple APs simultaneously. Thus, in some aspects, a station, such as station 104a, may be associated with both the AP 102a and the AP cluster controller 106. In some aspects, location information detected by the station 102a may be passed directly by the station 104a to the AP cluster controller 106. Furthermore, while the AP cluster controller 106 is shown as a physically separate device from any of the access points 102a-d, in various aspects, the AP cluster controller 106 may be physically integrated with one of the access points 102a-d. In these aspects, the communication that might otherwise occur over the back haul network 108 between the AP cluster controller 106 and an access point with which the AP cluster controller 106 is physically integrated, might instead occur via an internal bus or other interconnect technology of the integrated AP and AP cluster controller.

Figure 2:
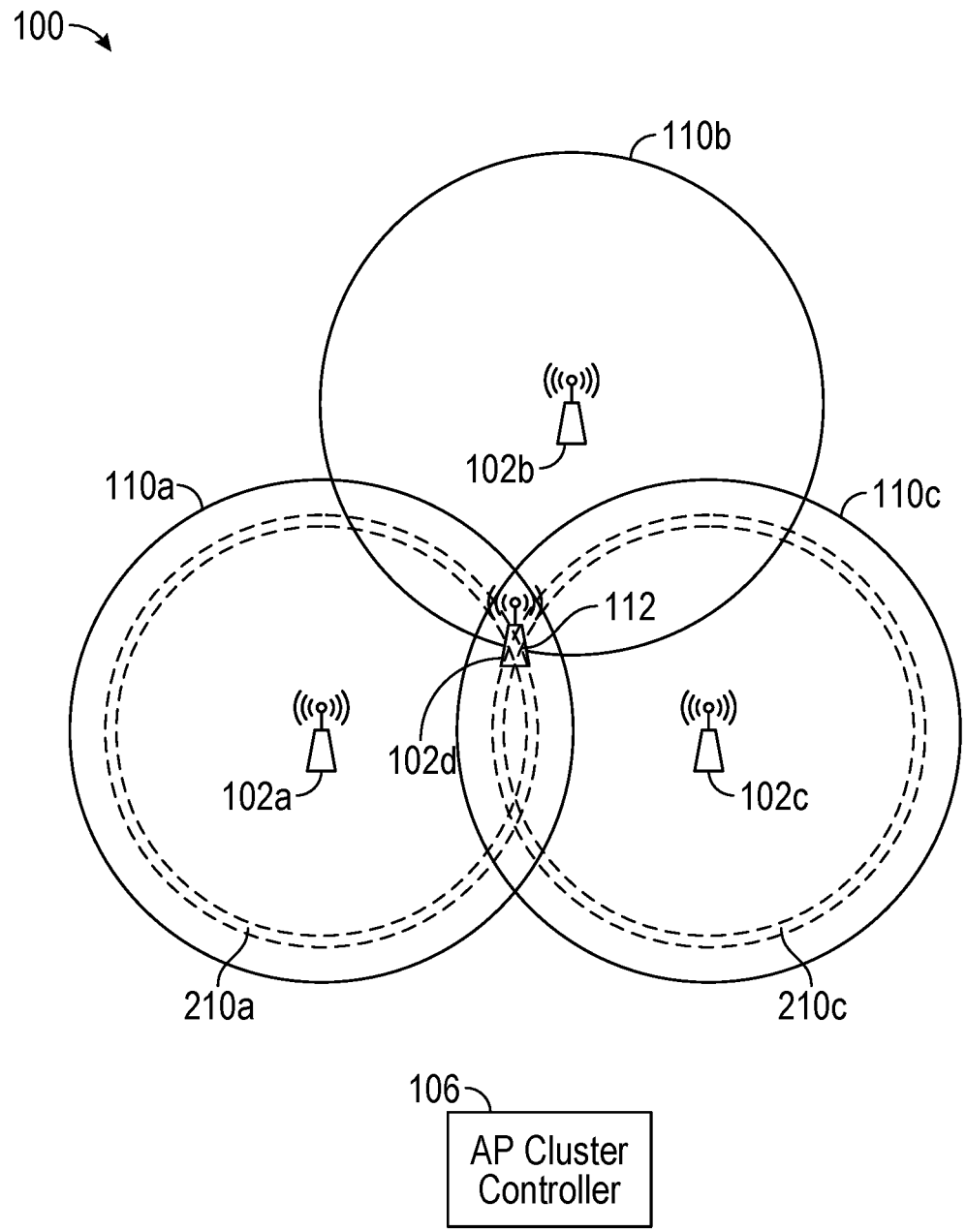
FIG. 2 shows a simplified view the wireless network of FIG. 1, where some components are omitted for clarity.

FIG. 2 shows a simplified view the wireless network 100 of FIG. 1, where some components are omitted for clarity. FIG. 2 shows the APs 102a-d, and their respective detection ranges 110a-c. As discussed above, APs implementing aspects of the present disclosure may provide a list of other APs that are visible, or other APs with a detection range encompassing the providing AP. In some embodiments of the present disclosure, signal strength of the visible APs may also be provided. The signal strengths may allow the AP cluster controller 106 to refine an estimate of the AP 104d's position relative to the estimate possible based on the detection ranges 110a-c alone. FIG. 2 shows refined detection ranges 210a-b within each of detection ranges 110a-b. The refined detection ranges 210a and 210c may be based on signal strength information provided by the AP 104d to the AP cluster controller 106 for each of the APs 102a and 102c respectively. The refined detection ranges 210a and 210c allow a more accurate location estimate for the AP 102d, as shown in FIG. 2 by the region 212. The technique shown with respect to FIG. 2 may be known as trilateration.

Figure 3:
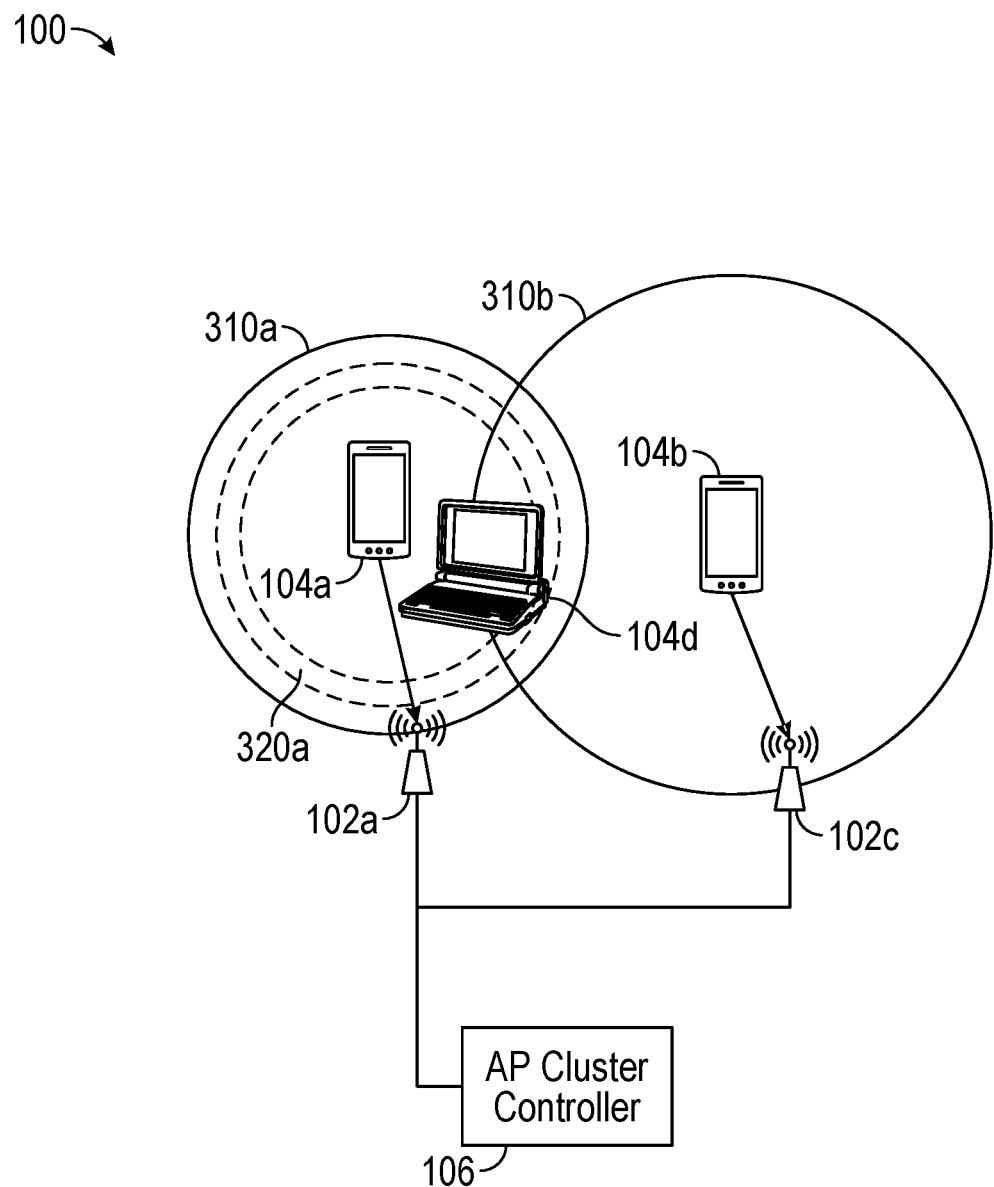
FIG. 3 shows another simplified view of the wireless network.

FIG. 3 shows another simplified view of the wireless network 100. FIG. 3 shows APs 102a and 102c, as well as stations 104a, 104b, and 104d. Station 104b is now associated with AP 102c, whereas station 104b was associated with AP 102b in the illustration of the wireless network 100 in FIG. 1. FIG. 3 shows that non-AP stations 104a and 104b also have detection ranges 310a and 310b respectively. The station 104d is within each of these detection ranges 310a and 310b. While the detection ranges 310a-b allow the station 104d to receive signals from the stations 104a and 104b, this also allows the stations 104a and 104b to receive signals from the station 104d. As such, the stations 104a-b may be configured to measure a strength of signals received from the station 104d and estimate a distance between the station 104d and the respective station 104a-b. For example, the stations 104a-b may consider a level of interference present within each of the respective detection ranges 310a-b, a received signal strength of signals received from the station 104d, and other parameters to estimate a distance between the station 104d and the respective stations 104a-b. The stations 104a-b may alternatively provide the signal strength information and other information such as interference estimates to the cluster controller 106, with the cluster controller 106 determining the approximate location of the station 104d based on the received information. FIG. 3 shows refined detection range 320a for the station 104a, which may be based on a received signal strength of one or more signals from the station 104b at station 104a. station 104b may determine a similar refined detection range for the station 104d based on a strength of a signal received at the station 104b from the station 104d.

In some aspects, reporting of station signal strength information may be triggered by a message from an access point or the access point controller. For example, in some aspects, the AP cluster may notify each of the access points under its control that a message has been originated by a particular station, in this case, an originating station. The station may be identified, in some aspects, by one or more of an association identifier and/or a media access control station address. The access points may distribute this notification to their associated stations, for example, in some aspects, via a beacon message. Upon receiving the notification, the stations may record signal strength and other parameters relating to signals received from the identified station, and pass this information and/or distance estimates for the identified station to an access point with which they are associated. The access points may then forward the information to the access point controller. Upon receiving the information, the access point controller may use the signal information for the identified station to estimate a position of the identified station, and utilize the position estimate for processing of the emergency call. This process is illustrated in the swimlane diagram of FIG. 4.

Figure 4:
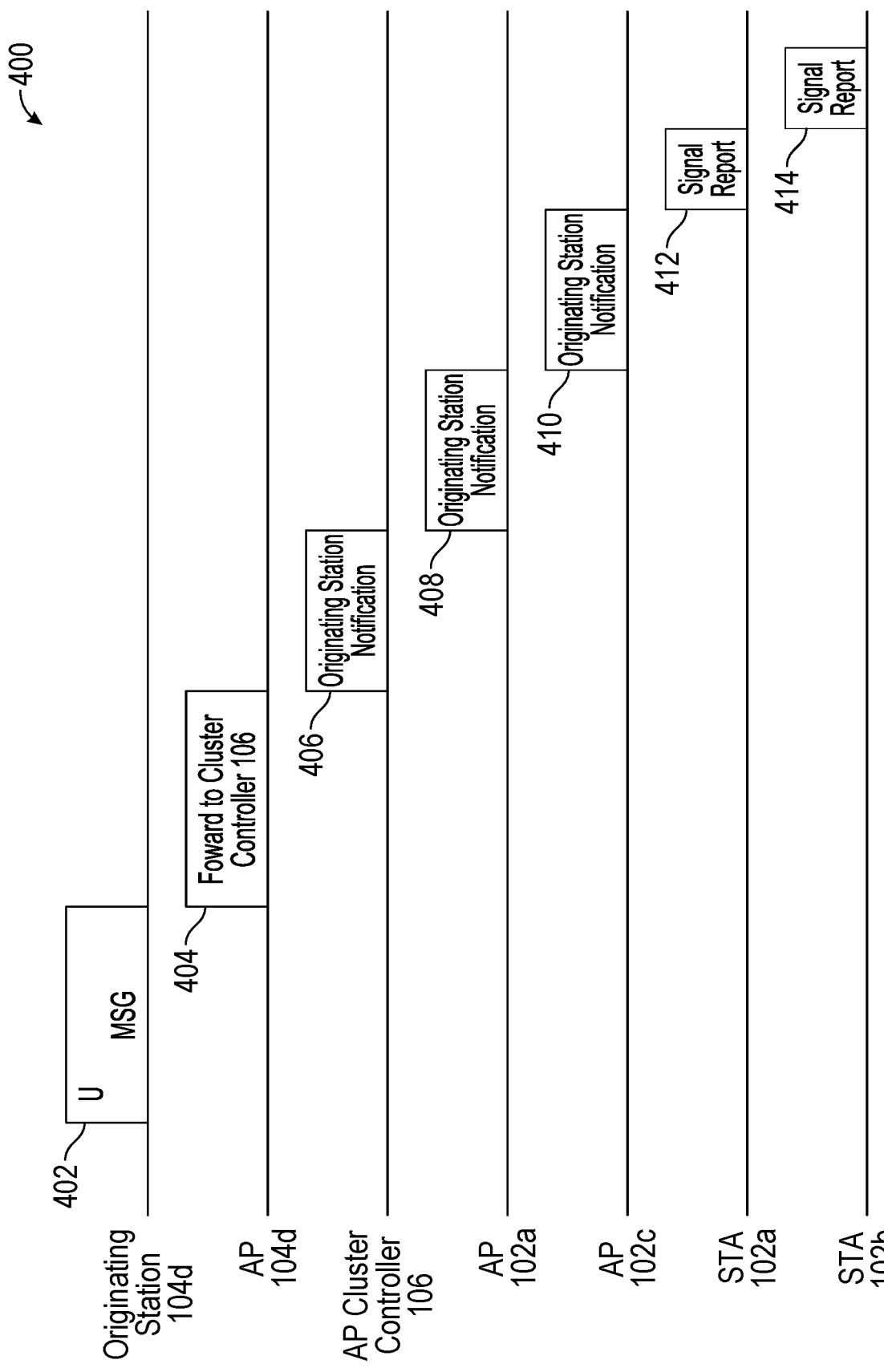
FIG. 4 is a swim lane diagram showing a message exchange during an emergency call.

FIG. 4 is a swimlane diagram showing a message exchange during an emergency call. FIG. 4 shows the originating station 104d transmits a location relevant message 402. The location relevant message 402 may request the establishment of an emergency call, such as a 911 call (e.g., United States) or a 119 call (e.g., Japan). The AP 104d may receive the location relevant message 402, and forward the message to a cluster controller (e.g, the cluster controller 106) via a message 404. In response to receiving the forwarded location relevant message 402, the AP cluster controller 106 may seek to confirm and/or determine a location of the originating station 104d before further processing of the message. To that end, the AP cluster controller 106 may transmit an originating station notification message 406. The originating station notification message 406 may notify stations on a wireless network that an originating station (e.g. station 104) has originated a location relevant message, such as a message initiating or maintaining an emergency call. The originating station notification message 406 may be transmitted by the AP cluster controller 106 to other APs in communication with the AP cluster controller 106, such as AP's 102a-d, shown above with respect to FIG. 1. Shown in FIG. 4 is a subset of these AP's, AP 102a, 102c, and 102d. In response to reception of the originating station notification 406, each of the AP's 102a and 102d may transmit an originating station notification message 408 and 410 respectively. In some aspects, one or more of the originating station notification messages 406, 408, and 410 may be broadcast on a medium. The originating station message 406 may be broadcast over a back-haul network (e.g. 108). The originating station notification messages 408 and 410 may be broadcast over a wireless network. Upon reception of the originating station notification messages, stations, such as stations 102a and 102b, may listen on the wireless network for transmissions by the originating or particular station 104d, which may be identified in the originating station notification messages 406, 408 and/or 410.

In response to receiving one of the originating station notification messages 406, 408, or 410, the stations 102a and 102b may transmit signal report messages 412 and 414. The signal report messages 412 and 414 may report signal strengths of signals received from the identified station (e.g. 104d). The signal reports 412 and 414 may also provide information on a location of the reporting device. The AP cluster controller 106 may receive the signal report messages 412 and 414 directly over the wireless network. Alternatively, the signal report messages 412 and 414 may be forwarded to the cluster controller 106 via an access point, such as the access points 102c and/or 102a.

The AP cluster controller 106 may then determine a location of the originating station 104 based on the information in the signal reports 412 and/or 414.

Examples of the originating station notification message(s) 406, 408, and 410, and the signal reports 412 and 414, are provided below.

Figure 5:
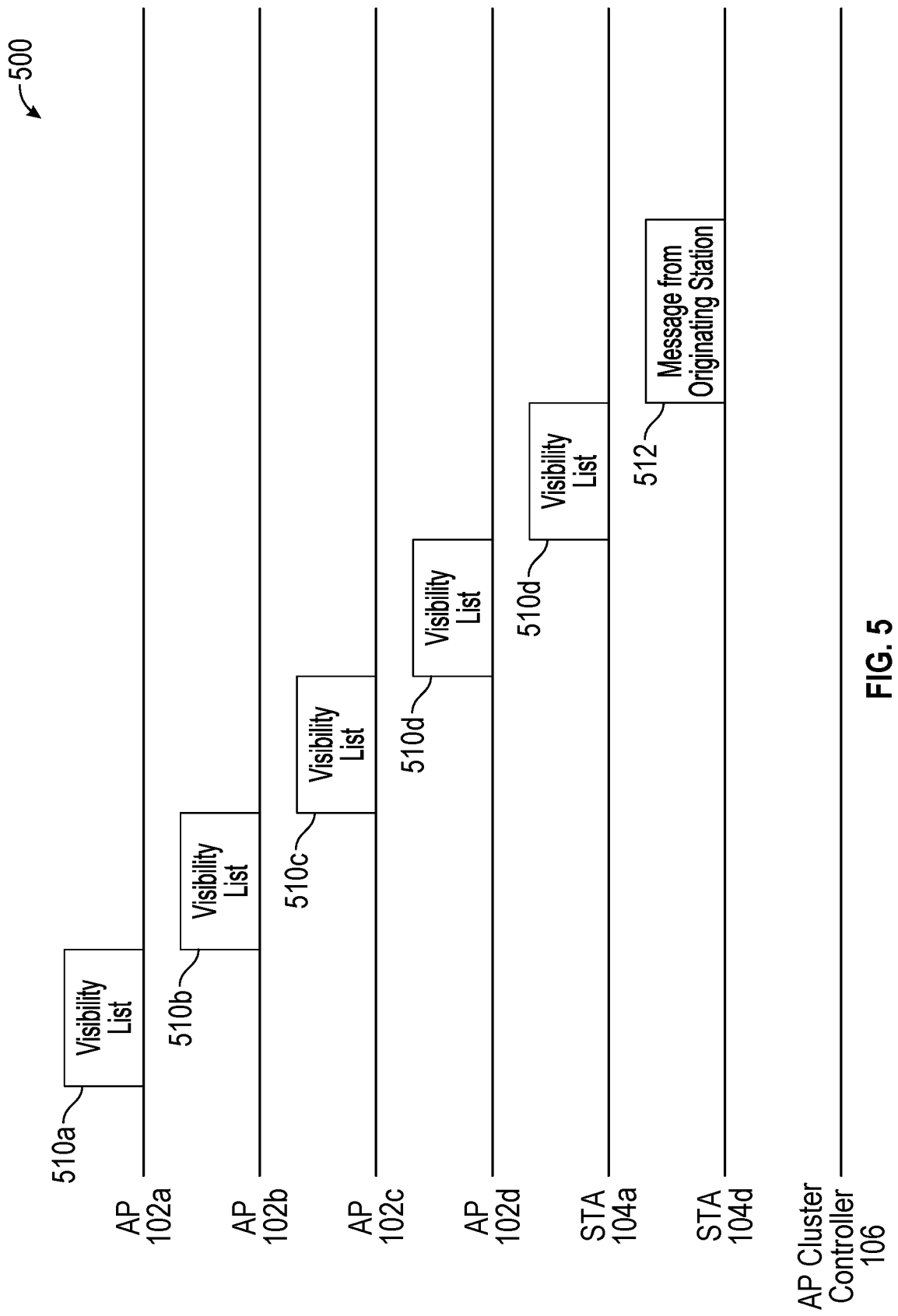
FIG. 5 shows another swim lane diagram which shows a message flow that may be implemented in at least some of the disclosed embodiments.

FIG. 5 shows another swim lane diagram which shows a message flow that may be implemented in at least some of the disclosed embodiments. FIG. 5 shows each of APs 102a-d transmitting a visibility list message 510a-d respectively. The visibility list messages 510a-d may indicate a list of access points visible from the device transmitting the respective messages (510a-d). The visibility list messages 510a-d may be received by the AP cluster controller 106. Information in the visibility list messages 510a-d may be used to determine locations for one or more devices, including one or more access points and/or one or more stations. FIG. 5 also shows the STA 104a transmitting a visibility list message 510e. STA 104d is shown initiating a message, such as a message requesting establishment of an emergency call, via message 512. The AP cluster controller 106 may determine a location for the STA 104d based, at least in part, on the visibility list messages 510a-e. For example, one or more of the visibility list messages 510a-e may be used to determine a location for an access point. For example, if the STA 104d is using the AP 102d to transmit a location relevant message, such as a message attempting to establish the emergency call, the AP cluster controller 106 may determine a location for the AP 102d based on one or more of the visibility list messages 510a-e. An example of a visibility list message is described below with respect to FIG. 6.

Figure 6:
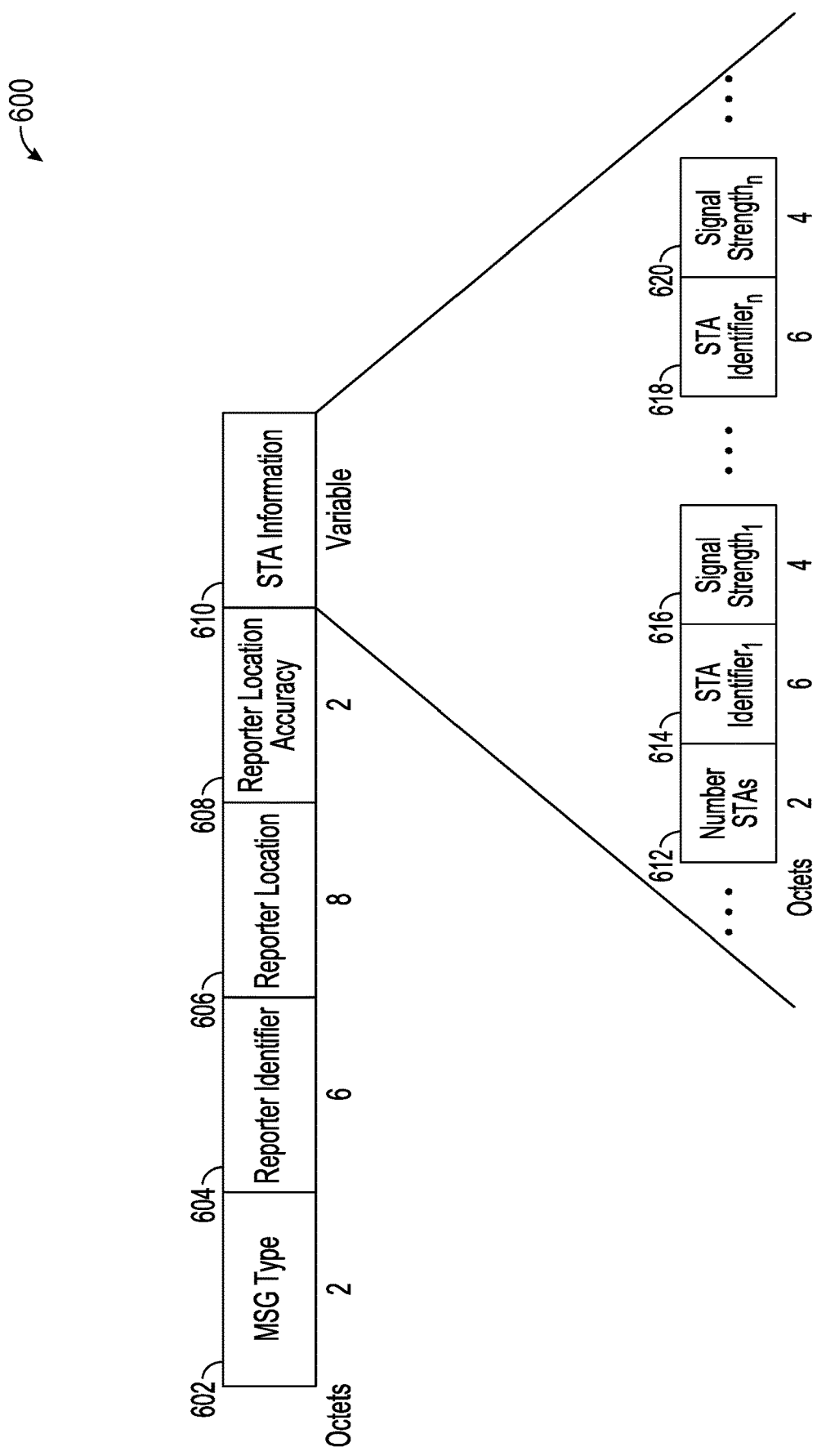
FIG. 6 shows an example format for at least a portion of a visibility list message

FIG. 6 shows an example format for at least a portion of a visibility list message. In some embodiments, one or more of the visibility list messages 510a-e discussed above with respect to FIG. 5 may include one or more of the fields discussed below with respect to the example visibility list message 600. The visibility list message portion 600 includes a message type field 602, report identifier field 604, reporter identifier field 604, reporter location field 606, reporter location accuracy field 608, and a station information field 610. The station information field 610 includes a number of stations field 612, repeating pairs of station identifier fields $614_{1-n}$ and signal strength fields $616_{1 \ldots n}$.

The message type field 602 may identify the message 600 as a visibility list message. In some aspects, the message type field 602 may be included in one or more of a type field and subtype field of a media access control header. The reporter identifier field 604 identifies a device originating the visibility list message. For example, the reporter identifier field 604 may identify a media access control address of a device transmitting the visibility list message. In some aspects, the reporter identifier field 604 may be included in a transmitter address field (not shown) of a media access control header, included in the visibility list message. The reporter location field 606 indicates a physical or geographic location of the reporting device. The reporter location accuracy field 608 indicates an accuracy level of the reporter location field 606. In some aspects, the reporter location accuracy field 608 may indicate a size of a region in which the location 606 has a percentage change (e.g., 50%) of being within. A larger region indicates a relatively less accurate location value in the reporter location field 606, while a smaller region indicates a relatively more accurate location value in the reporter location field 606. The AP info field 610 indicates one or more access points visible from the reporting device (e.g. the device identified by the reporter identifier 604).

The number of stations field 612 indicates a number of stations reported by the visibility list message 600. The stations identified in the visibility list message 600 may be access points or non-access point stations in various embodiments. Following the number of stations field 612 are repeating pairs of values, one pair for each station reported by the visibility list message 600. The repeating pairs include an STA identifier field 614 that identifies a visible station, such as an access point or a non-AP station. In some aspects, the STA identifier field 614 may indicate a basic service set identifier (BSSID) of the visible access point or non-AP station. In other embodiments the STA identifier field 614 may indicate a media access control station address of the visible station. The signal strength field 616 indicates a strength of one or more received signals from the STA identified by the field 614, as received at the reporting device (e.g., device identified by the reporter identifier field 604).

Figure 7:
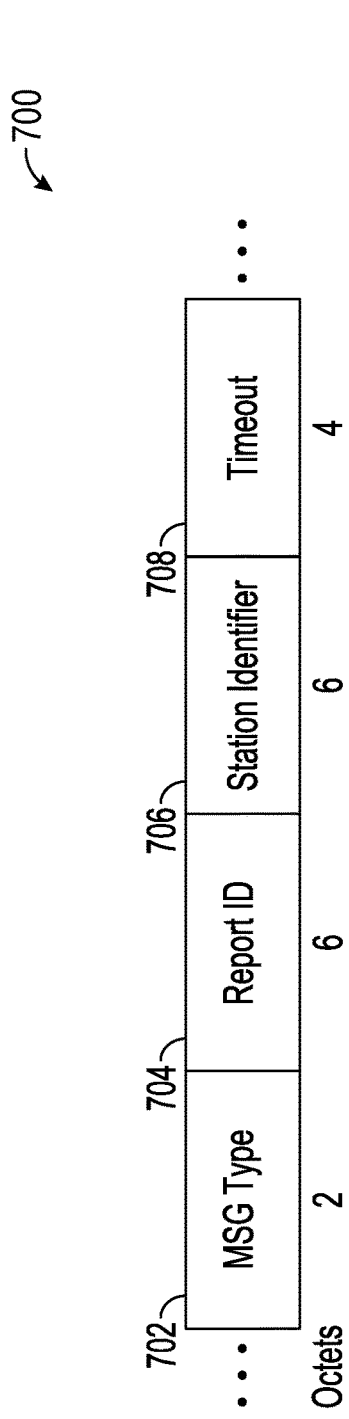
FIG. 7 is an example of a originating station notification message, such as the originating station notification messages discussed above with respect to FIG. 4.

FIG. 7 is an example of an originating station notification message, such as the originating station notification messages 406, 408, and 410, discussed above with respect to FIG. 4. The example message 700 includes a message type field 702, report identifier field 704, station identifier field 706, and a timeout value 708. The message type field 702 identifies the message 700 as an originating station notification message. In some aspects, the message type field 702 may be incorporated into a type and subtype field (not shown) of a media access control header. The report identifier field 704 uniquely identifies a particular instance of a originating station notification sequence. For example, each originating station notification message generated by, for example, an AP cluster controller (e.g., 106) may have a unique report identifier field 704. This may allow stations, access points, and/or cluster controllers to keep track of which station reports (e.g. messages 412 and 414 discussed above with respect to FIG. 4), are in response to particular originating station notification messages. The originating station notification message 700 also includes a station identifier field 706. The station identifier field 706 may uniquely identify a particular station. For example, the station identifier field 706 may indicate a media access control address of a originating or particular station, or other unique identifier for the originating station (e.g. 104*d*).

The originating station notification message 700 also includes a timeout field 708. The timeout field 708 may indicate a time after which response to the originating station notification message 700 is not required or needed. In some aspects, the timeout field 708 may represent an absolute time, for example, based on a central time source, such as a GPS clock. In other aspects, the timeout field 708 may represent a relative value, such as a number of seconds after the message 700 is transmitted.

Figure 8:
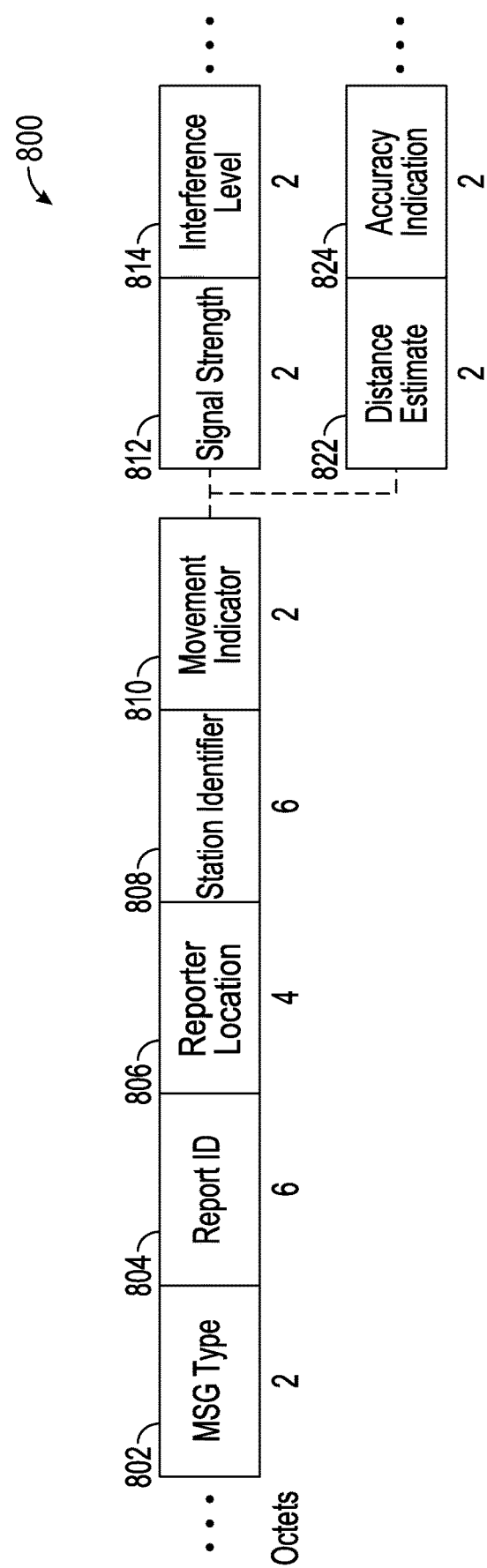
FIG. 8 is an example of a signal report message.

FIG. 8 is an example of a signal report message. One or more of the signal report messages 412 and/or 414 may include one or more of the fields discussed below with respect to the example signal report message 800. The example signal report message 800 includes a message type field 802, report identifier 804, reporter location field 806, station identifier field 808, movement indicator field 810. Two embodiments of the signal report message 800 are shown. In a first embodiment, the signal report message 800 also includes a signal strength indicator field 812, and an interference level field 814. A second embodiment of the signal report message 800 may include a distance estimate field 822 and an accuracy indication field 824.

The message type field 802 may identify, via a predefined value, that the message 800 is a signal report message. The report identifier field 804 may include a value also included in a corresponding originating station notification message (e.g. field 704 of message 700). The report identifier field 804 allows a receiving device to understand which originating station notification message the message 800 is in response to. The reporter location field 806 indicates a location of the reporting device. This information may be used by a device receiving the signal report message 800 to determine a location of the station whose signal is being reported. The station identifier field 808 identifies a station whose signal(s) are being reported. In some aspects, the station identifier field 808 indicates a media access control address of the reported station. The movement indicator 810 indicates whether the reporting device has indications that the reported station (e.g. identified by the station identifier 808) may be moving. The movement indicator may be an integer value, with lower values indicating less movement and greater values indicating greater movement. In some aspects, the movement indicator 810 may be within a range, such as zero (0) to one hundred (100), with zero indicating no movement detected and 100 indicated strong movement detected. The signal strength field 812 may indicate a signal strength of the reported station, as seen by the reporting station. In some aspects, the signal strength field 812 may indicate a received signal strength indication (RSSI). The interference level 814 may indicate a level of interference at the reporting station. The interference level 814 may be used by a device receiving the message 800 to determine a reliability or credibility of the information included in the message 800.

The distance estimate 822 included in the second embodiment of the message 800 may indicate, in feet, meters, or other unit of distance, an estimated distance between the reporting station (at the location indicated by field 806) to the reported station (having station identifier 808). The accuracy indication field 824 indicates an accuracy of the distance estimate 822. In some aspects, the accuracy estimate may indicate a size of a region in which there is a 50% probability the reported station is within.

FIG. 9 shows an example PIDF-Lo file. The example PIDF-LO file may be used to communicate location information in a location relevant message, such as a message establishing or otherwise maintaining an emergency call.

For example, the PDID-Lo file format 900 includes location information 905, which may store location information for a device performing an emergency call. In some aspects of the disclosure, the location information 905 may be initialized, replaced, or augmented based on location information determined for an access point and/or originating station, as described in more detail below.

Figure 10:
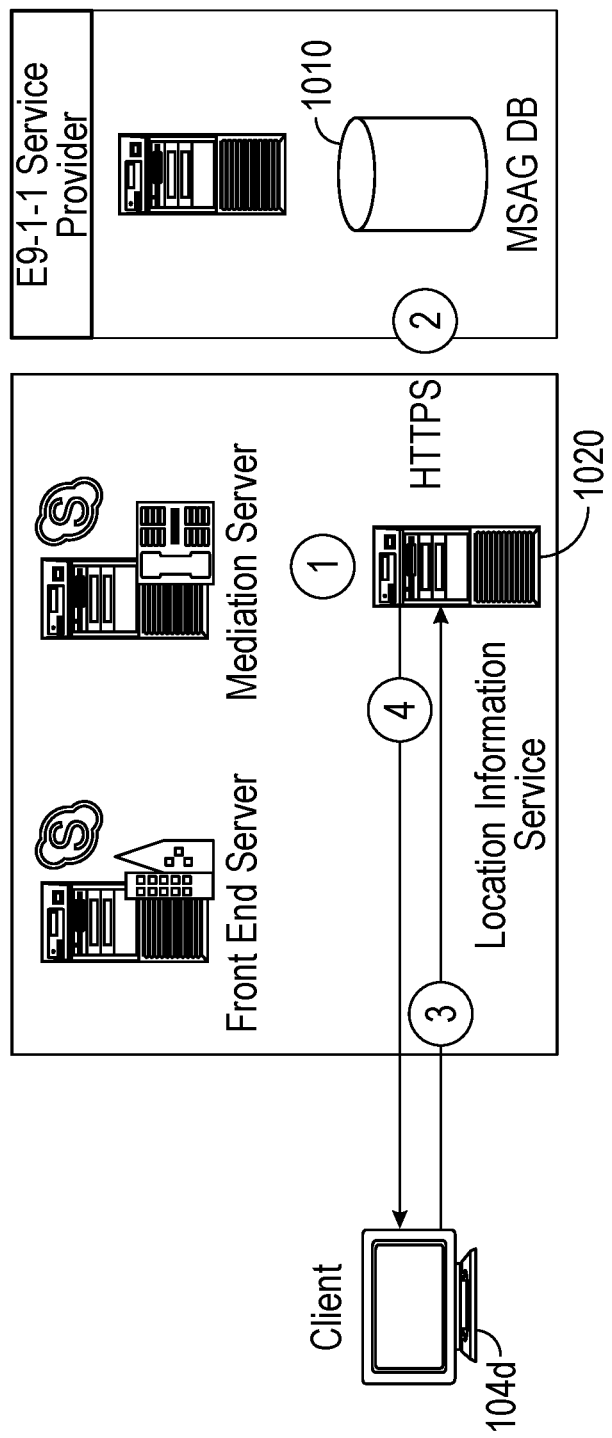
FIG. 10 shows an example of how a client device performing an emergency call acquires a location in some embodiments.

FIG. 10 shows an example of how a client device originating a location relevant message (e.g., 104d) acquires a location in some embodiments. For a client to acquire a location, the following steps may be performed. First, an administrator may populate a location information service database with a network wiremap (tables that map various types of network addresses to corresponding Emergency Response Locations (ERLSs). When a SIP trunk E9-1-1 service provider is used, the administrator may validate a civic address portion of the ERLs against a master street address guide (MSAG) database 1010 maintained by an E9-1-1 service provider. If an ELIN gateway is used, the administrator ensures that a PSTN carrier uploads the ELINs to the Automatic Location Identification (ALI) database. During registration or when a network change occurs, an internally-connected client 104d sends a location request that contains the client's discovered network address to the Location Information service 1020. The location information service 1020 may query its published records for a location, and if a match is found, may return an ERL to the client 104d in PIDF-Lo format, such as the example PIDF-LO format shown above with respect to FIG. 9.

Figure 11:
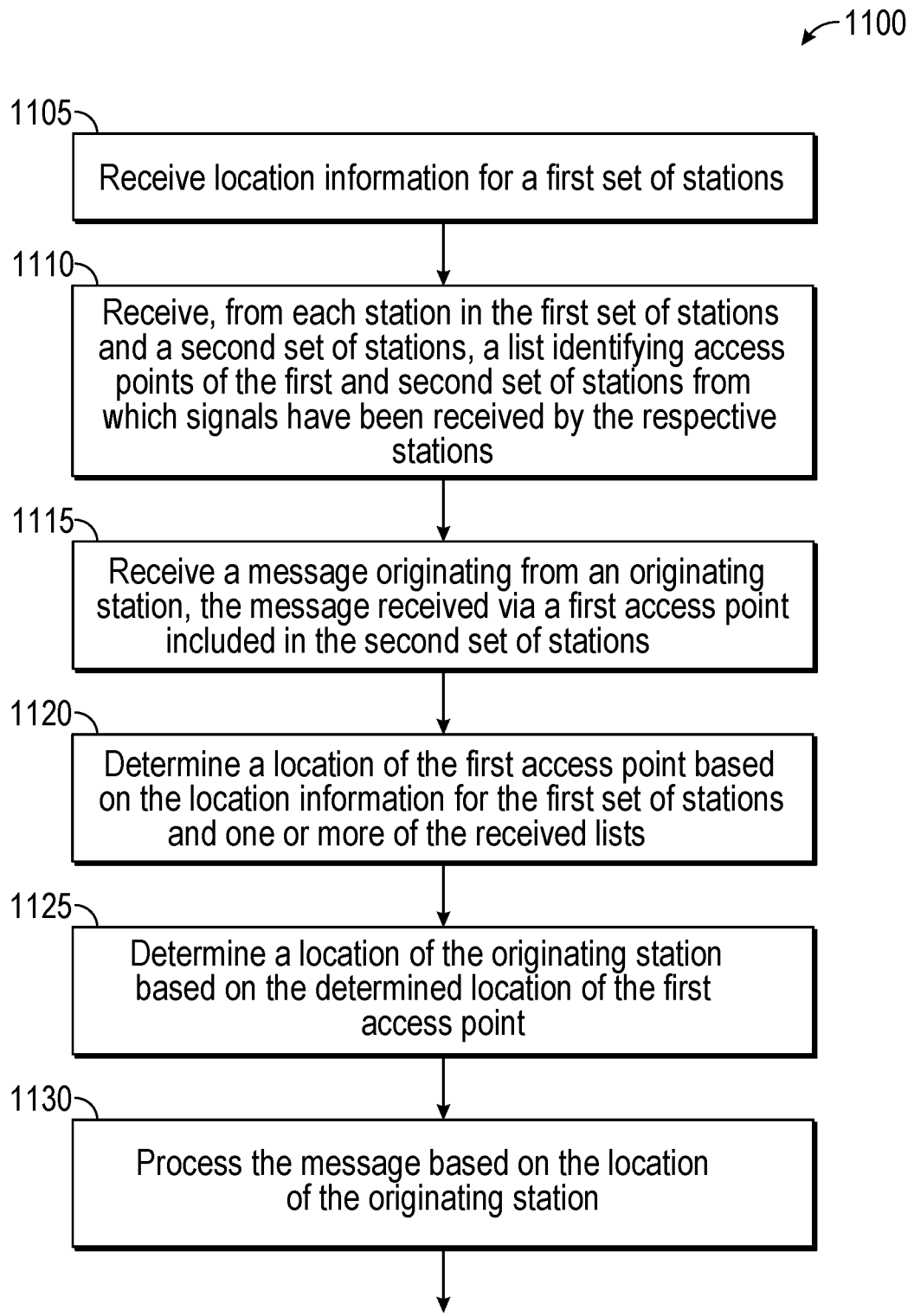
FIG. 11 is a flowchart of a method of determining a location of a originating station.

FIG. 11 is a flowchart of a method of determining a location of an originating station. In some aspects, one or more of the functions discussed below with respect to process 1100 of FIG. 11 may be performed by hardware processing circuitry. For example, a memory may store instructions that configure the hardware processing circuitry to perform one or more of the functions discussed below with respect to FIG. 11. In some aspects, the hardware processing circuitry may be equivalent to the processor 2002, discussed below. In some aspects, the memory may be equivalent to the memory 2005, also discussed below with respect to FIG. 20. In some aspects, one or more of the functions discussed below may be performed by an AP cluster controller, such as the AP cluster controller 106 discussed above.

In operation 1105, location information is received for a first set of stations. In some aspects, the first set of stations may be considered "seed" stations, in that they seed a database of location information that may be used to determine locations of other stations, as discussed below. In some aspects, the first set of stations includes access points, such as one or more of the access points 102a-c discussed above with respect to FIG. 1. In some aspects, the first set of stations may also include non-AP stations, such as one or more of the stations 104a-c discussed above with respect to FIG. 1. In some aspects, the location information may be received via a configuration user interface for an access point cluster controller, such as the AP cluster controller 106. An example of such a configuration user interface is provided below with respect to FIG. 17A. In some aspects, the first set of stations may include location determination equipment, such as a GPS receiver or other positioning device. The stations in the first set of stations may then provide the location information to an access point and/or an AP cluster controller to accomplish operation 1105. In some aspects, the location information of operation 1105 may be obtained via an internet service that provides such information. For example, at the time of this writing, some internet services provide location information based on information relating to visible access points and/or cell phone towers. Thus, in some aspects, the location information of operation 1105 may be obtained via use of one of these services. The location information for a device such as an access point may boundaries of a geographic region in which the device is located. In some aspects, the location information may include geodetic coordinates and in some aspects, an accuracy level of the coordinates. In other aspects, the location information may include data to define a geographic region, such as vector information defining the region.

In operation 1110, one or more lists identifying access points are received. The lists may be received from one or more respective stations included in the first set of stations, and/or also stations in a second set of stations, that are not in the first set of stations. The stations in the first set of stations and/or the second set of stations may be access points or non-AP stations. For example, in some aspects, non-AP stations may forward a list of visible devices to an AP with which they are associated. This information may then be forwarded by the receiving AP to an AP cluster controller (e.g. 106).

In some aspects, location information for stations in the second set of stations may not be known. For example, locations for these stations may not be configured via a configuration user interface, such as the configuration user interface 1700, discussed below with respect to FIG. 17A. Thus, process 1100 may operate, at least initially, without information on the locations of stations included in the second set of stations. The one or more lists received in operation 1110 identify access points from which signals are received by the respective one or more reporting stations. Thus, each list identifies which access points are "visible" from a reporting station. The reporting station may be a non-AP station or an AP itself.

In operation 1115, a message may be received. The message originates from an originating station (e.g. 104d). The message is received via a first access point (e.g. 102d). The first access point is included in the second set of stations. In some aspects, the message may request establishment of a digital telephony call, such as an emergency call. In some aspects, a message may not be received in operation 1115, but the originating station may be identified for location determination. Once the location is determined as described below, it may be stored for later use.

In operation 1120, a location of the first access point is determined. The location may be determined based on the location information for the first set of stations and one or more of the lists received in operation 1110. In some aspects, operation 1120 may be performed by determining which of the first set of stations have visibility to the first access point. In other words, operation 1120 may determine which of the first stations include the first access point in their list of visble access points. Based on the know locations of stations in the first set of stations, operation 1120 may determine a region in which the first access point is positioned, based on how detection regions of the first set of stations with visibility of the first access point overlap. As discussed above with respect to FIG. 2 for example, the first access point (e.g. 102d may be visible to one or more stations (e.g. 102a-c). Since the first access point (e.g. 102d) is visible to this set of stations, an overlapping portion of detection regions (e.g. 110a-c) of these access stations (e.g. 102a-c) define a region in which the first access point (e.g. 102d) is positioned.

In some aspects, one or more of the lists received above in operation 1110 may include signal strength information for at least some of the APs identified in the lists. For example, as discussed above with respect to the example visibility message 600, AP information included in the message 600 may include an identifier of the AP, such as a BSSID or station address, and a signal strength of signals received from the reporting device. Thus, the overlapping region determined from stations which have visibility of the first access point may be refined or reduced in size by considering the signal strength information. As discussed above with respect to FIG. 2, signal strength information may allow reduction of a detection region for a station or access point to be reduced from, for example, a size of detection region 110*c,* to a size of reduced detection region 210*c* (note FIG. 2 is not intended to be drawn to scale, but does demonstrate visually the general nature of how signal strength information may be used to reduce a size of a detection region. In some aspects, operation 1120 may determine a center position of the region defined by the overlapping detection areas, and determine the location of the first access point as the center position. An accuracy of the location determination may be determined, at least in part, on a size of the overlapping detection regions for stations having visibility to the first access point. In some aspects, a transmission power of the first access point may also be used in the determination. For example, the first access point may transmit a message, in some aspects, the AP cluster controller, (e.g., 106) indicating its transmission power. The transmission power of the first access point may be used to determine a size and/or position of the detection regions of the other stations having visibility to the first access point. For example, a larger transmission power of AP 102*d* may shift the refined detection region 210*c* shown in FIG. 2 further from the AP 102*c* than a smaller transmission power of the AP 102*d,* all other variables being equivalent. Detection regions of other stations (e.g. 102*a-b*) with visibility to the first access point (e.g. 102*d*) may also be modified based on the transmission power of the AP 102*d.* In some aspects, a location of the access point may be determined via a clustering algorithm, such as K-means clustering, centroid based clustering, distribution based clustering, density based clustering, or connectivity based clustering. The clustering may be based on location information for the first set of stations and the lists of visible devices from each of the first and second set of stations.

In operation 1125, a location of the originating station may be determined, based, at least in part, on the determined location of the first access point. In some aspects, the location of the originating station may be assigned to the location of the first access point determined in operation 1120. In some aspects, the location of the originating station may be based on the location of the first access point. For example, the first access point may estimate a distance of the originating station from the first access point, and/or provide one or more of signal strength information, interference information, and transmission power information for the originating station. The location of the originating station may then be determined further based on this information. In some aspects, the first access point may further be able to estimate a bearing to the originating station. For example, the first access point may be equipped with a plurality of antennas, which may enable the first access point to receive signals from the originating station from at least two of the antennas, and based on offsets in the signals received by the at least two antennas, determine a bearing to the originating station. Thus, the first access point may provide this information to an AP cluster controller, or determine an updated position estimate for the originating station based on one or more of the information discussed above. Alternatively, this information may be passed by the first access point to an AP cluster controller, with the AP cluster controller determining a position estimate for the originating station based on a position estimate of the first access point, and one or more of transmission power information for the originating station, received signal strength indications at the first access point for the originating station, and bearing information derived by the first access point for the originating station.

In operation 1130, the message from the originating device is further processed based on the location of the originating station determined in operation 1125. Some aspects of operation 1130 may generate a PIDF-Lo file indicating the determined location, and forward the PIDF-Lo file to another device that will process the message from the originating device. In some aspects, a SIP invite message may be modified to incorporate the determined location of the originating device. The location information may, in some aspects, be forwarded over a network (e.g. network 120) to complete an emergency call. For example, the PIDF-Lo file may be transmitted to a PSAP located in the network 120.

Figure 12:
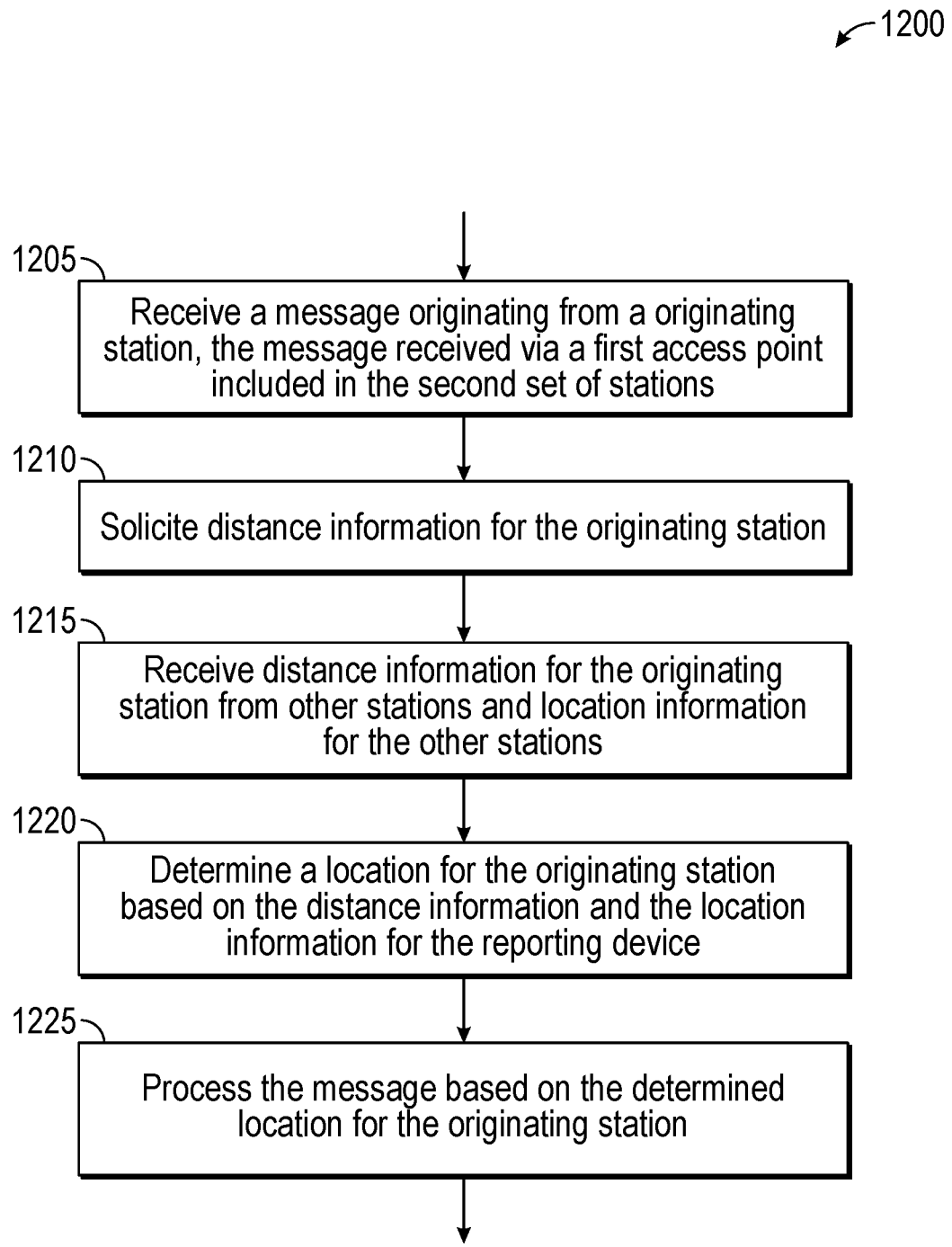
FIG. 12 is a flowchart of a method of determining a location of a originating station.

FIG. 12 is a flowchart of a method of determining a location of an originating station. In some aspects, one or more of the functions discussed below with respect to process 1200 of FIG. 12 may be performed by hardware processing circuitry. For example, a memory may store instructions that configure the hardware processing circuitry to perform one or more of the functions discussed below with respect to FIG. 12. In some aspects, the hardware processing circuitry may be equivalent to the processor 2002, discussed below. In some aspects, the memory may be equivalent to the memory 2005, also discussed below with respect to FIG. 20. In some aspects, one or more of the functions discussed below may be performed by an AP cluster controller, such as the AP cluster controller 106 discussed above. In some aspects, the process 1200 discussed below may be performed by an access point.

In operation 1205, a message is received. The message originates from an originating station (e.g. 104*d*). The message is received via a first access point (e.g., 102*d*). The originating station may be associated with the first access point, such that the first access point is providing communication services to the originating station. Upon receiving the message from the originating station, the first access point may forward the message to an AP cluster controller (e.g., the AP cluster controller 106). In some aspects, the message may request initiation or maintenance of a digital telephony call. In some aspects, the digital telephony call is an emergency call, such as a call to 911 (e.g., United States) or 119 (e.g., Japan).

In operation 1210, distance information is solicited for the originating station. As described above, in some embodiments, an originating station notification message, (e.g., 700) may be transmitted to indicate an originating station has generated a message. The message may request initiation of, or be included as part of, a digital telephony call in some aspects. In some aspects, the call may be an emergency call. The originating station notification message may be broadcast in some aspects, by an AP cluster controller over a backhaul network (e.g., 108). The originating station notification message may be received by one or more access points in communication with the AP cluster controller (e.g., such as any one or more of the APs 102*a-d*). The receiving APs may optionally broadcast the originating station notification message over their respective wireless networks to their associated stations. Reception of the originating station notification message may cause receiving devices to listen on their respective wireless mediums for transmissions from the station identified in the originating station notification message (e.g. via station identifier 706).

In operation 1215, distance information is received for the originating station. In some aspects, the distance information is in the form of signal strength indications of signals received from the originating device by a reporting device (e.g., a device sending the information). The signal strength indications may be received from other stations responding to the originating station notification message transmitted in operation 1210. In some aspects, the received signal strength indications may be received in one or more signal report messages (e.g., 800). The originating station may be identified via the station identifier field in the signal report messages (e.g. 808). Alternatively, operation 1215 may receive one or more distance estimates (e.g., 822) from one or more reporting stations (e.g., 804), depending on which embodiment of the signal report message (e.g., 800) is implemented. Operation 1215 may also include receiving location information for reporting stations. For example, the one or more messages received in operation 1215 may include distance information for the originating station, represented as either a distance estimate (e.g., 822) or signal strength indication(s) (e.g., 812), and also location information for the reporting device (e.g., 806). This may allow a receiver of the indications to estimate a position of the originating device, as described further below.

In operation 1220, a location of the originating station is estimated based on the received distance information for the originating station and location information for the one or more reporting devices. As discussed above with respect to FIG. 3, when signal strength information is received for the originating station, a distance range between a reporting station and the originating device may be determined based on the signal strength indication of the originating station at the reporting station. Separate distance ranges for each reporting station may be determined with overlapping distance ranges representing possible locations for the originating device. The distance ranges of each reporting station may be adjusted by a transmission power of the originating device, when known. Thus, one or more geographic regions may be determined to include the location of the originating device based on overlapping distance ranges of the reporting devices. A center position of these one or more geographic regions may be used as a best estimate for a location of the originating device. An accuracy indication of this position estimate may also be determined, at least in part, based on a size of the overlapping distance ranges.

In operation 1225, the message is processed based on the determined location for the originating station. For example, operation 1225 may generate a PIDF-Lo file to include the determined location of the originating station. The message received in operation 1205 may be forwarded toward a destination node or destination device, for example, by an AP cluster controller over a land based network (e.g., such as network 120). The PIDF-Lo file may also be forwarded towards the destination node or destination device in operation 1225.

Figure 13:
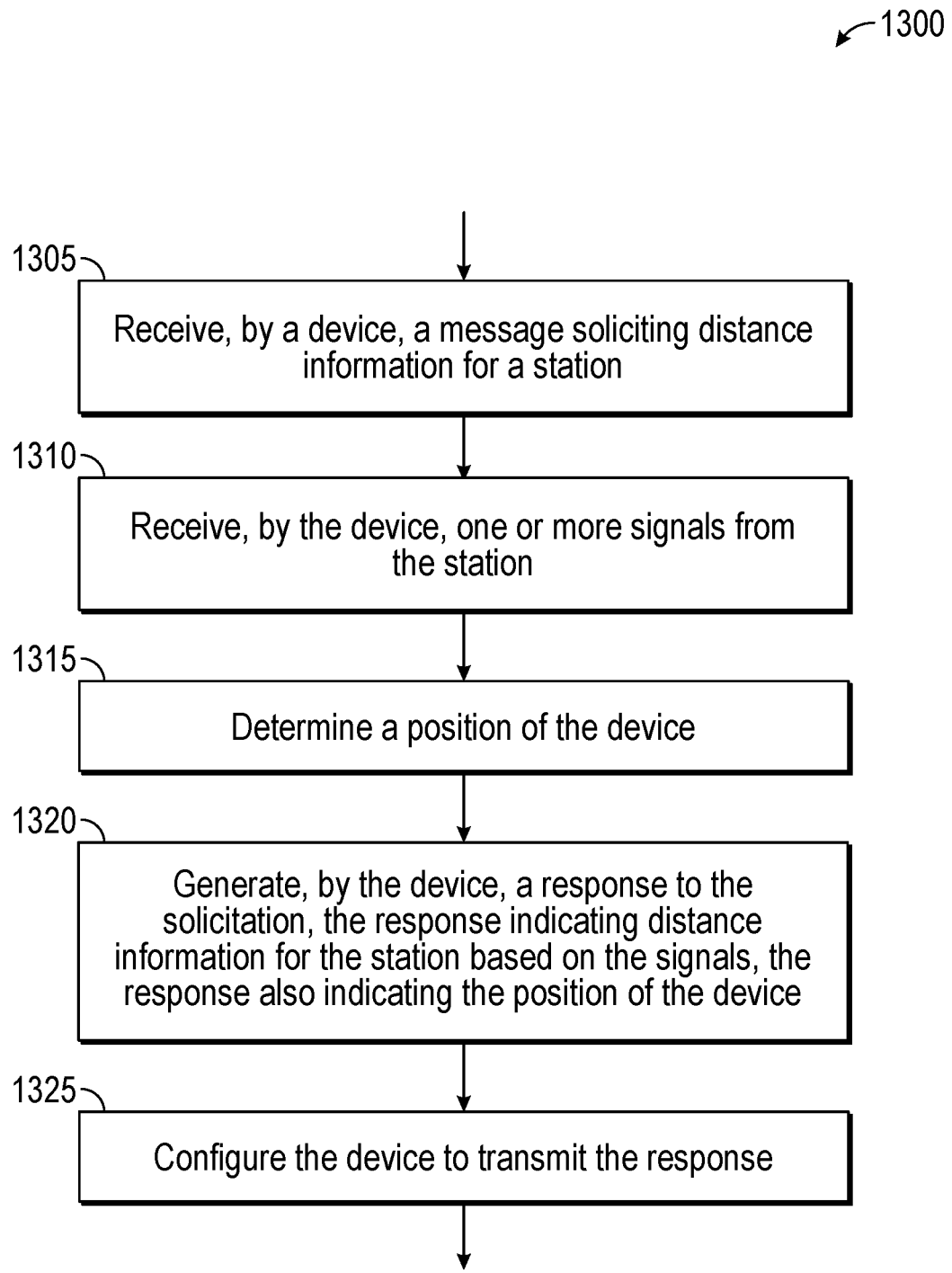
FIG. 13 is a flowchart of a method of providing distance information for an originating station

FIG. 13 is a flowchart of a method of providing distance information for an originating station. In some aspects, one or more of the functions discussed below with respect to process 1300 of FIG. 13 may be performed by hardware processing circuitry. For example, a memory may store instructions that configure the hardware processing circuitry to perform one or more of the functions discussed below with respect to FIG. 13. In some aspects, the hardware processing circuitry may be equivalent to the processor 2002, discussed below. In some aspects, the memory may be equivalent to the memory 2005, also discussed below with respect to FIG. 20. In some aspects, one or more of the functions discussed below may be performed by a station, such as a non-AP station (e.g., STAs 104*a-c*), or an AP station (e.g., 102*a-c*). In the discussion below, a device performing process 1300 of FIG. 13 may be referred to as an "executing device."

In operation 1305, a message is received by the executing device. The message is decoded to determine that the message solicits distance information for an originating station. In some aspects, the station may be identified via an association identifier or a media access control address of the station included in the received message. In some aspects, the received message may include one or more of the fields of message 700, discussed above. In some aspects, the message may be an originating station notification message, which may be indicated via the message type field 702. The message type field 702 may, in some aspects, be split across two or more fields. For example, in some aspects, the message type field 702 may be included in a type and subtype field of a frame control field of a media access control header included in the message. In response to the reception or decoding of the message in operation 1305, the executing device may configure its wireless receiver so as to receive messages from the identified station. For example, in some aspects, the identified station may be within a basic service set (BSS) in which the executing device is active, or associated with an access point managing the BSS. The station identified by the received message may be either within the BSS or outside the BSS. In some cases, receiving a message from a station outside the BSS may require at least some reconfiguration of a wireless receiver included in the executing device.

In operation 1310, one or more signals from the identified station are received by the executing device. In some aspects, a received signal strength or a received signal strength indication (RSSI) may be determined for one or more of the received signals. In some aspects, directional information for the receiver signals may also be determined. For example, in some aspects, the executing device may be configured with a plurality of antennas. Reception of the signal(s) from the identified station at different times by the plurality of antennas may be used to estimate a relative position of the identified station from the executing device. Furthermore, in some aspects, the executing device may be configured with an electronic compass, such that it can determine its own orientation with respect to the north, east, west, and south directions of the earth. Based on the direction information and orientation information, a bearing to the identified station from the executing device may be estimated in some embodiments.

In operation 1315, a position of the executing device is determined. In some aspects, the position may be determined via positioning equipment included in the executing device, such as a via a global positioning system (GPS) receiver. In some other aspects, the position information may be derived via signals received from one or more access points or cellular towers. In these aspects, locations of the access points and/or cellular towers may be known, and the executing device may derived its position from this information.

In operation 1320, a response to the solicitation received in operation 1305 is generated. In some aspects, generating the response including allocating a portion of memory to store values arranged in a format consistent with a format of the response, and initiating the memory to values appropriate for the response. The response is generated to indicate distance information for the station based on the received signals of operation 1310. The response is also generated to indicate the position of the executing device. In some aspects, the response is sent to a device that transmitted the solicitation. For example, a transmitter address field in the solicitation message may be used as a receiver address in the response. In some aspects, the response is transmitted to an access point with which the station is associated. In some other aspects, the response may be transmitted to an access point with which the executing device has no current association. In some aspects, the response may be broadcast. This transmission, by a wireless station to a non-associated access point is somewhat unconventional, but may provide for a broad range of signal receivers for the identified station. One motivation for this approach is to improve possible location determinations for the identified stations by obtaining signal information from a large variety of listening devices, including those devices that are both associated with an access point managing the identified station, and other devices that are not.

In operation 1325, the executing device is configured to transmit the response. In some aspects, configuring the executing device to transmit may include a hardware processor notifying a transmitter or transceiver that the generated message of operation 1320 is ready for transmission. In some aspects, operation 1325 including transmitting the response. The response may be transmitted to a device that originally transmitted the request received in operation 1305, as discussed above.

Figure 14:
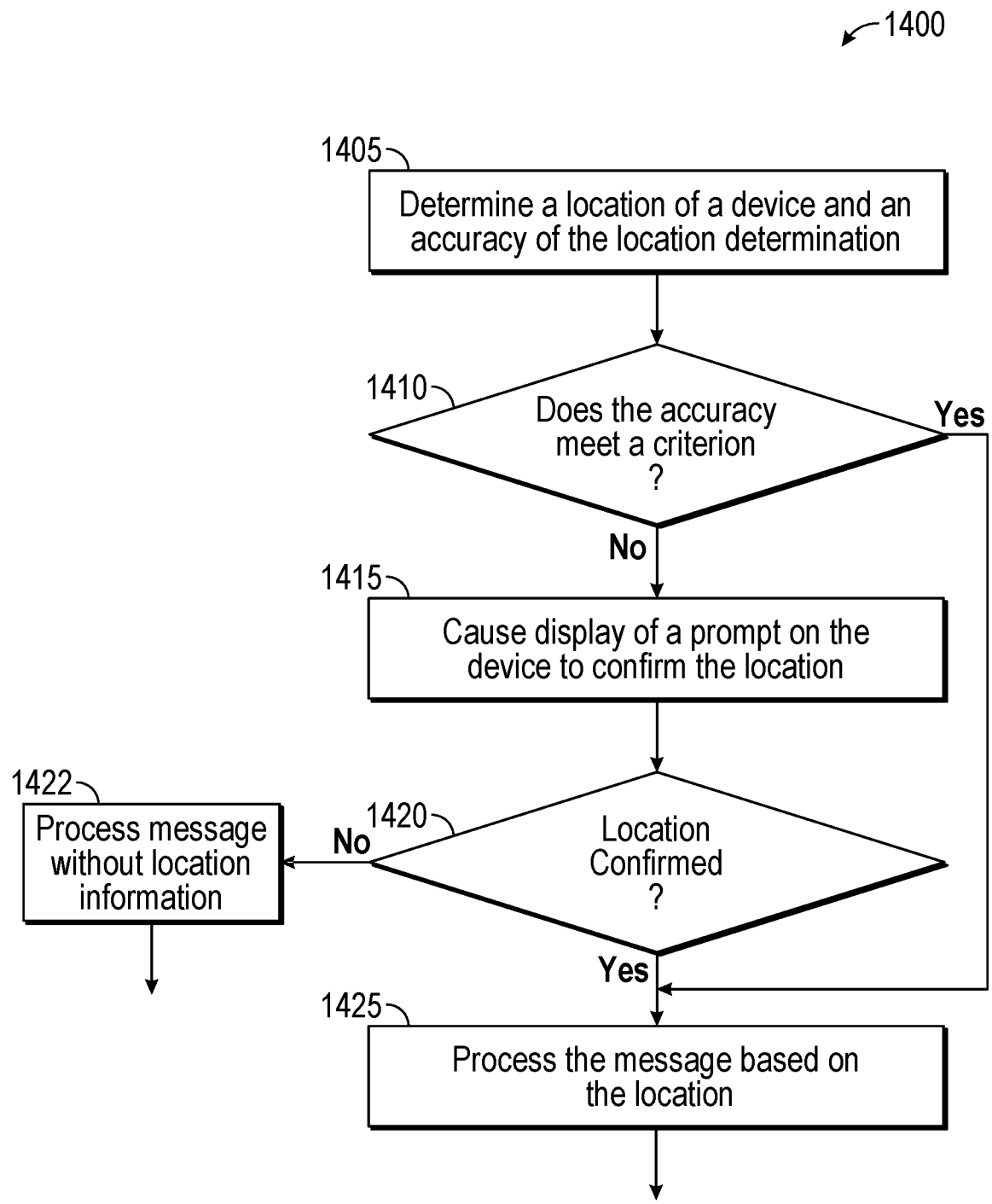
FIG. 14 is a flowchart of a method of providing distance information for an originating station.

FIG. 14 is a flowchart of a method of providing distance information for an originating station. In some aspects, one or more of the functions discussed below with respect to process 1400 of FIG. 14 may be performed by hardware processing circuitry. For example, a memory may store instructions that configure the hardware processing circuitry to perform one or more of the functions discussed below with respect to FIG. 14. In some aspects, the hardware processing circuitry may be equivalent to the processor 2002, discussed below. In some aspects, the memory may be equivalent to the memory 2005, also discussed below with respect to FIG. 20. In some aspects, one or more of the functions discussed below may be performed by a station, such as a non-AP station (e.g, STAs 104a-c), or an AP station (e.g., 102a-c). In the discussion below, a device performing process 1400 of FIG. 14 may be referred to as an "executing device." In some aspects, the executing device may be the AP cluster controller 106. In some other aspects, the executing device may be an access point, such as any of the access points 102a-d.

In operation 1405, a location of an originating device (e.g. 104d) is determined and an accuracy of the location determination is also determined. In some aspects, the location of the originating device may be determined based on a location of an access point associated with the originating device (e.g. 102d). For example, in some aspects, the location of the access point may serve as a proxy for the location of the access point. In other words, the location of the access point may be used as a location of the originating device. In some other aspects, the location of the originating device may be based on location information received from one or more other devices. For example, information included in one or more responses generated in operation 1320 may be used to determine the location of the originating device The accuracy may be based on a size of a geographic area in which the originating device may be located. This geographic area may be determined based on one or more of a location of the access point associated with the originating device and/or the location information received in operation 1320. As discussed above, in some aspects, the location information received from a plurality of stations may each device separate geographic regions in which the originating device may be present. In some aspects, one or more of the separate geographic regions may be regions within a distance of a device reporting location information (e.g. circles such as any of detection regions 110a-c). In some aspects, one or more of the separate geographic regions may be portions of circular regions such as detection region 210c, which may be derived based on signal strength information received by a reporting device, which may allow the reporting device to determine a distance range in which the originating device falls.

A region defined by where these separate regions overlap may then represent a final region in which the originating device is positioned. The accuracy of the location determined in operation 1405 may be based on the size of this region, with larger regions representing a less accurate location determination and a smaller region representing a more accurate location determination.

Decision operation 1410 determines if the accuracy meets a criterion. For example, a total area of the final region may need to fall below a threshold size in order for the accuracy of the location determination to be sufficient. If the accuracy does meet the criterion, process 1400 moves from decision operation 1410 to operation 1425, discussed below.

Figure 15:
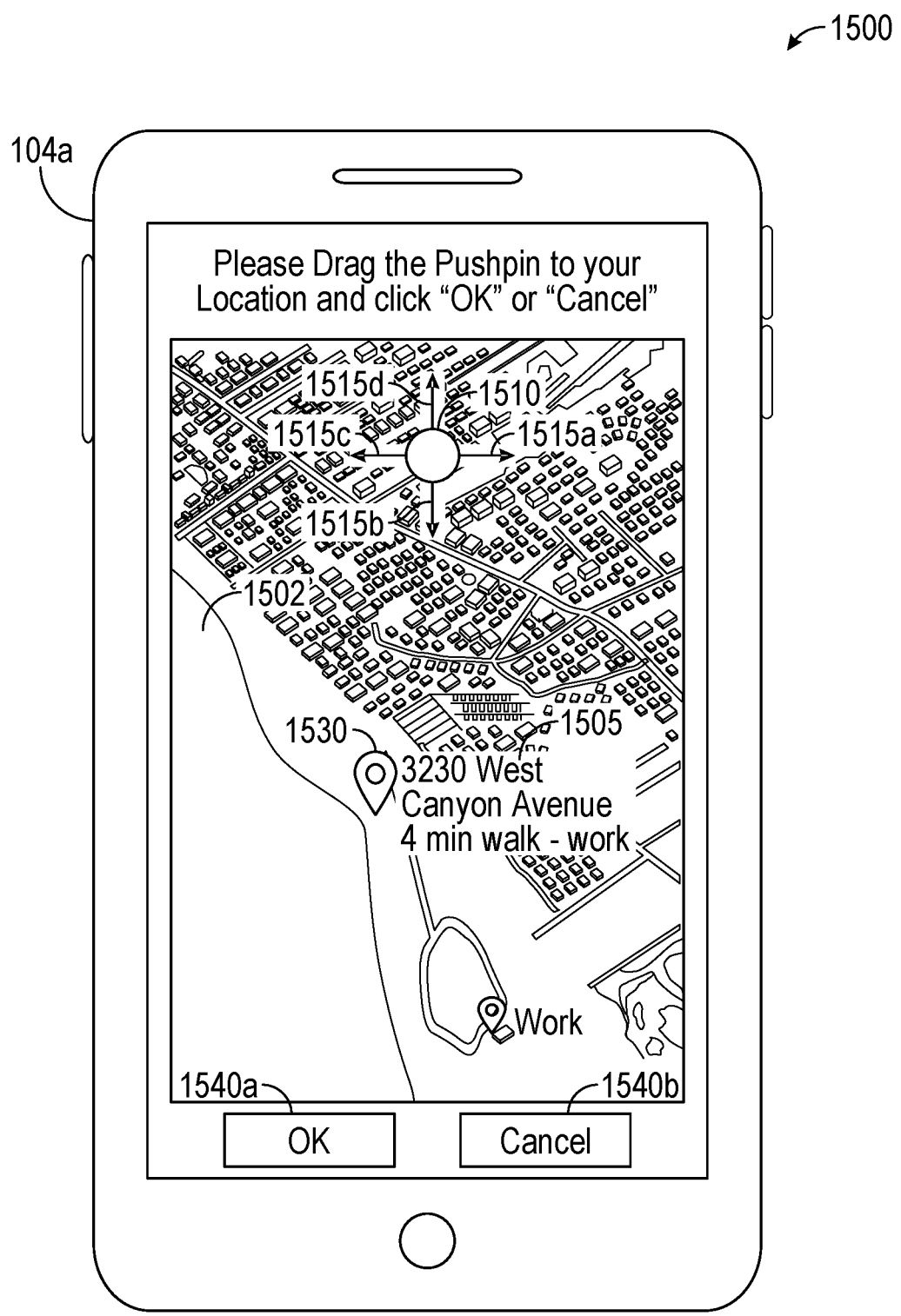
FIG. 15 shows an example of the prompt requesting confirmation of an originating station location.

If the accuracy of the location does not meet the criterion, or in other words, the accuracy of the location is not judged to be sufficient for use in the message, process 1400 moves to operation 1415, which causes display of a prompt on the originating device. The prompt requests that a user of the originating device confirm the location. In some aspects, the prompt may be initialized to indicate the more accurate location information for the originating device available. For example, the location determined in operation 1405 may be used to initialize the prompt. In some aspects, a map of the determined location may be shown. An example of the prompt is shown in FIG. 15. The prompt 1500 of FIG. 15 shows a map 1502 that includes an initial location 1505. An indicated location of the originating device, station 104a in this example, may be adjusted via a touch input, represented by the circle 1510. While the prompt is shown displayed on a smartphone device, a similar prompt could also be displayed on a laptop device, such as device 104d shown in FIG. 1, or any other electronic device that includes a display. After touching the screen of the device shown in FIG. 15, the touch input may be slid in any direction, represented by the arrows 1515a-d, such that a pushpin 1530 is positioned at the originating device's true location, as perceived by a user. Once the adjustment is made, the user may click the ok button 1540a. Alternatively, if the user is unable to determine their location on the provided map 1502, the user may select cancel 1540b.

Returning to the discussion of FIG. 14, decision operation 1420 determines whether the location is confirmed by the prompt displayed as part of operation 1415. In other words, in some embodiments, if the ok button 1540a was selected by the user when the prompt 1500 was displayed, decision operation 1420 determines the location was confirmed by the prompt, based on a position of the pushpin 1530 relative to the map 1502 in the embodiment of FIG. 15. In that case, process 1400 moves from decision operation 1420 to operation 1425, which processes the message based on the confirmed location. In some aspects, processing the message based on the confirmed location may include inserting or updating the location information into a location relevant message, such as a SIP invite message, and forwarding the message onto a digital network towards a destination node. For example, the AP cluster controller 106 may forward the location relevant message to the network 120 in some aspects.

Figure 16:
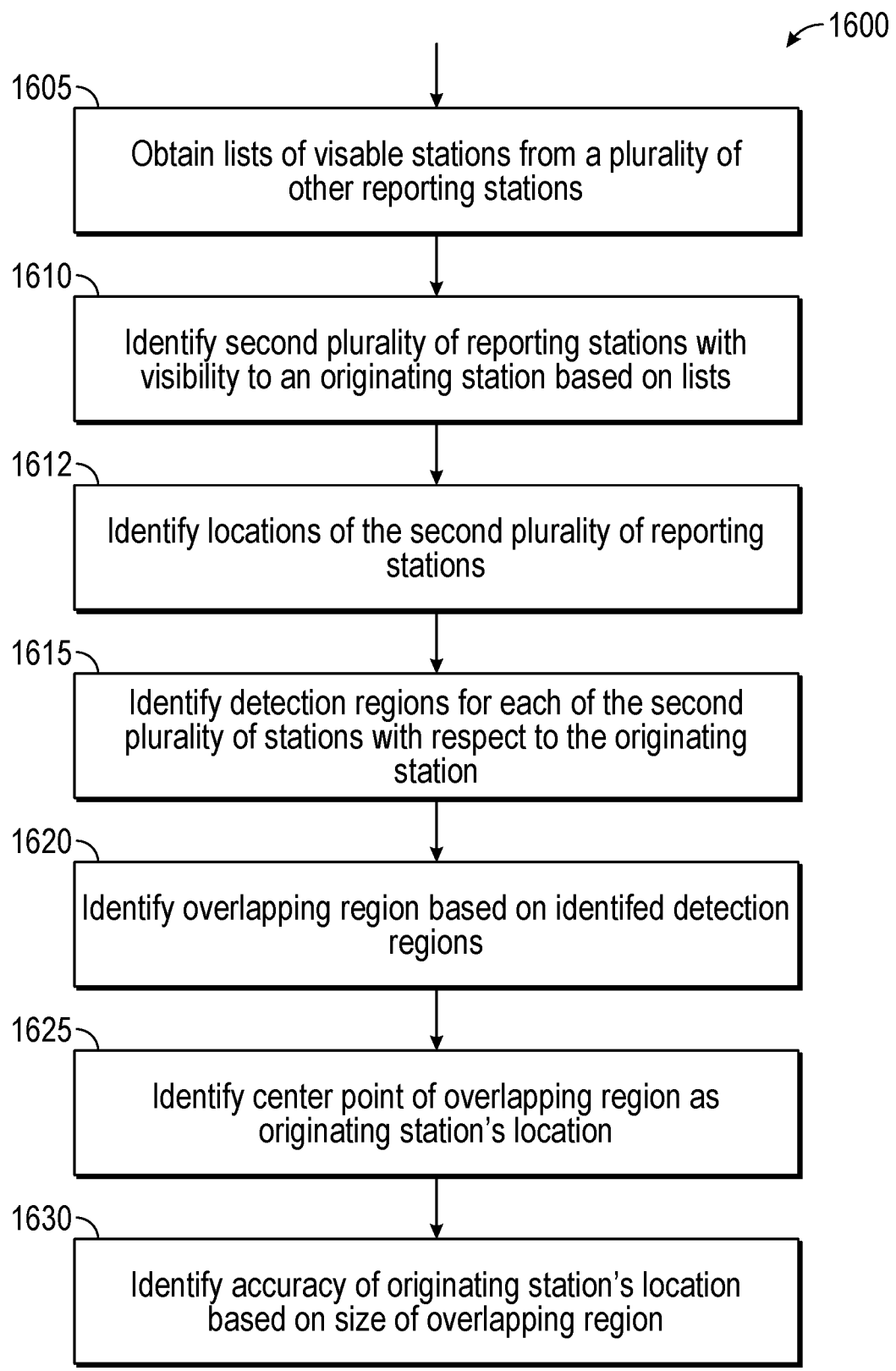
FIG. 16 is a flowchart of a method of determining a location and an accuracy of the location determination for an originating station.

FIG. 16 is a flowchart of a method of determining a location and an accuracy of the location determination for an originating station. In some aspects, one or more of the functions discussed below with respect to process 1600 of FIG. 16 may be performed by hardware processing circuitry. For example, a memory may store instructions that configure the hardware processing circuitry to perform one or more of the functions discussed below with respect to FIG. 16. In some aspects, the hardware processing circuitry may be equivalent to the processor 2002, discussed below. In some aspects, the memory may be equivalent to the memory 2005, also discussed below with respect to FIG. 20. In some aspects, one or more of the functions discussed below may be performed by a station, such as a non-AP station (e.g, STAs 104a-c), or an AP station (e.g., 102a-c). In the discussion below, a device performing process 1600 of FIG. 16 may be referred to as an "executing device." In some aspects, the executing device may be the AP cluster controller 106. In some other aspects, the executing device may be an access point, such as any of the access points 102a-d.

In operation 1605, lists of visible stations are received from a plurality of other stations. In some aspects, the lists of visible stations identify access points and/or stations. The lists are received from access points and/or stations. In some aspects, the lists may be included in messages that include one or more of the fields of message 600, discussed above with respect to FIG. 6.

In operation 1610, a second plurality of stations are identified that have visibility to an originating station. In other words, the lists obtained in operation 1605 may be filtered to include a subset of lists that identify the originating station.

In operation 1612, locations of the second plurality of reporting stations may be obtained. In some aspects, these locations are obtained by decoding a signal report message, such as the signal report message 800 discussed above with respect to FIG. 8. For example, in some aspects, the reporter location field 806 may be decoded from a plurality of signal report messages to obtain the locations of the second plurality of reporting stations.

In operation 1615, detection regions for each of the second plurality of stations are identified with respect to the originating station. For example, in some aspects, a detection region of a station may be based on a region defined by a circle with the station at the circle's center. The radius of the circle may be a detection distance of the reporting station. In some aspects, one or more of the lists obtained in operation 1605 may include transmit power information of the visible stations, bearing information and/or distance information for the visible stations, such as signal strength information. This information may allow the executing device to further define the detection regions. For example, the radius of a detection region may be based on a signal strength of a visible station, with generally, a higher signal strength indicating a shorter radius and a weaker signal strength indicating a longer radius. Furthermore, transmit information for a visible station may further be used to refine the detection region, i.e. the radius of the detection region. In some aspects, bearing information may enable a detection region to be reduced from a full circle around the reporting station to a wedge or pie shaped region with the bearing information at the center of the wedge. The width of the wedge may be based on the accuracy of the bearing information.

In operation 1620, an overlapping region is determined. The overlapping region includes a geographic area included in all of the detection regions identified in operation 1615. In some aspects, the overlapping region may include two or more disjointed regions.

In operation 1625, a center point of the overlapping region is identified as the originating stations location. In operation 1630, an accuracy of the originating station's location is based on a size of the overlapping region. For example, the accuracy may be inversely proportional to the size of the overlapping region, in that a large size represents a large amount of uncertainty (and thus low accuracy) as to the actual true location of the originating station, while a small size of the overlapping region represents a relatively smaller amount of uncertainty (and thus greater accuracy) as to the actual true location of the originating station.

Figure 17A:
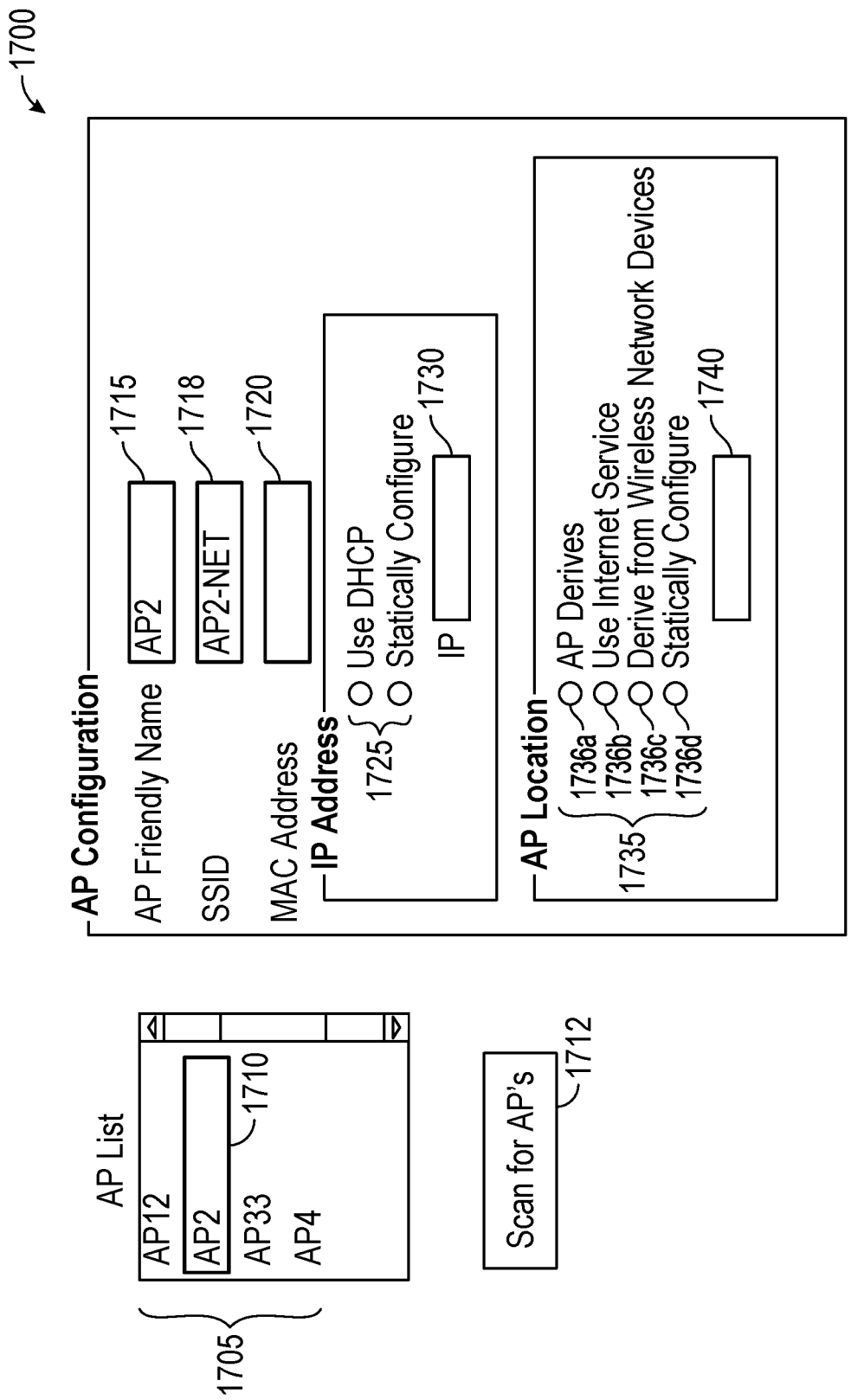
FIG. 17A shows an embodiment of a configuration user interface that may be provided in at least some of the disclosed embodiments.

FIG. 17A shows an example embodiment of a configuration user interface that may be implemented in at least some of the disclosed embodiments. In some aspects, the configuration user interface 1700 shown in FIG. 17A may be provided by the AP cluster controller 106, discussed above with respect to FIG. 1 and/or any access point, such as any of the access points 102a-d. For example, instructions stored in a memory, such as instructions 2024 stored in main memory 2004 may configure processing circuitry, such as processor 102, to display the user interface 1700 and/or receive and/or store parameters discussed below with respect to FIG. 17A.

The user interface 1700 displays an access point list, shown as 1705 in FIG. 17A. The access point list identifies one or more access points managed by an AP cluster controller (e.g., 106). The AP list may include a selection indication 1710. The selection indication 1710 indicates which AP in the AP list 1705 is presently being configured by the user interface 1700. Thus, the user interface 1700 shown in FIG. 17A is shown as the AP "AP2" is being configured via parameter values shows to the right of the AP list 1705.

The user interface 1700 includes an AP friendly name field 1715. This field provides a way to name an access point managed by the AP cluster controller. The user interface 1700 also includes an SSID field 1718. The SSID field 1718 may enable a user of the interface 1700 to configure an SSID for the AP highlighted by the selection indicator 1710. In some aspects, the configuration user interface 1700 may read the SSID from the AP and display the SSID in the field 1718. The user interface 1700 also includes a media access control address field 1720. This provides a way for an administrator to identify an access point managed by the AP cluster controller presenting the user interface 1700. In some aspects, other methods of identifying an access point may be used. The user interface 1700 also includes an IP address configuration radio button selection 1725. Selecting a first radio button configures the AP to use dynamic host configuration protocol (DHCP) for an IP address. Selecting a second radio button provides for static configuration of an AP IP address using an IP address field 1730. The user interface 1700 also provides for configuration of a method of determining the AP's location via a radio button group 1735. A first radio button 1736a in the group 1735 provides for configuring the AP to derive its own location. For example, in some aspects, an AP may be equipped with a positioning receiver, such as a GPS receiver that allows the AP to determine its own location. Alternatively, an AP may utilize any of the methods described in this disclosure for determining its own position. For example, an AP may receive signal information from other APs or stations and derive its position from this information.

A second radio button 1736*b* of the radio button group 1735 provides for use of an internet service to obtain a location estimate for the access point. For example, in some aspects, an internet service may provide a location estimate based on one or more of visible cell phone towers and/or visible access points and/or WiFi access points. In some aspects, selection of button 1736*b* may cause the AP cluster controller presenting the user interface 1700 to solicit a list of visible devices from the AP being configured (e.g. "AP2" as shown in FIG. 17A). The AP being configured may respond with a message, such as message 600 described above, that identifies devices that are visible from the AP's location. In some aspects, the message 600 may further include identification information for one or more cell towers that are visible from the AP's location. The AP cluster controller (e.g. 106) may then invoke an internet based service to obtain a location estimate for the AP being configured, with the location estimate based on the list of visible devices (such as APs) and, in some aspects, cell towers.

A third radio button 1736*c* in the radio button group 1735 provides for the AP cluster controller (e.g., 106) to derive the AP's position or location estimate. The method selected by radio button 1736*c* may provide for a more accurate location determination than the method selected by radio button 1736*b* in that, in some aspects, an AP cluster controller (e.g. 106) may have broader access to more signal information that may be used to determine an estimate of the AP's position than the AP itself. For example, in some aspects, selecting radio button 1736*c* may utilize one of the methods discussed above to determine a location of an access point. For example, the method described with respect to FIG. 11 may be used in some aspects. Radio button 1736*d* of radio button group 1735 provides for static configuration of the AP's location via edit box 1740.

The user interface 1700 may also include a control, such as the button 1712 that may facilitate the addition of access points to the AP list 1705. Upon selection of the button 1712, a second user interface may be displayed to facilitate the addition of seed access points to the AP list 1705. An embodiment of such a second user interface is shown in FIG. 17B.

Figure 17B:
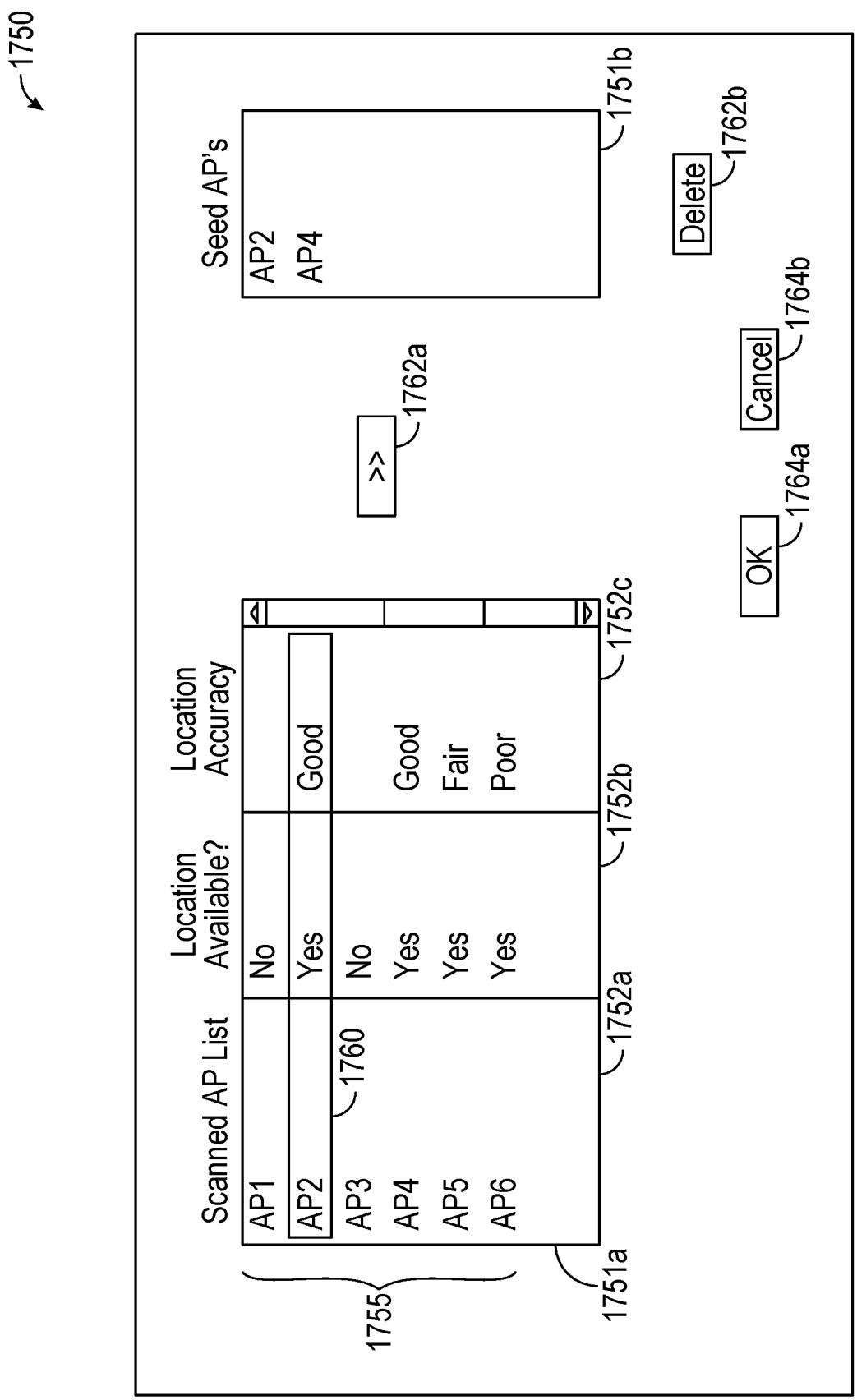
FIG. 17B shows an embodiment of a configuration user interface that may be provided in at least some of the disclosed embodiments.

FIG. 17B shows an example of a user interface for obtaining seed access points that may be implemented in at least some of the disclosed embodiments. The user interface 1750 of FIG. 17B includes a scanned AP display window 1751*a* and a seed access point display window 1751*b*. The scanned AP display window 1751*a* includes three columns 1752*a*m 1752*b,* and 1752*c*. The column 1752*a* identifies access points found during a scan for access points. The scan may be accomplished by detecting signals generated by the access points from a wireless network or a wired network in various embodiments. The column 1752*b* indicates whether location information for each of the access points shown in column 1752*a* has been detected. The location information may include geodetic coordinates of the corresponding access point or a geographic region in which the access point is located. In some aspects, software implementing the user interface 1750 may use an internet service to determine whether location information is available for an AP listed in the scanned list to display the location information of column 1752*b*. The third column 1752*c* indicates an accuracy of any location information indicated in column 1752*b*. The example user interface 1750 shows the accuracy classified as either good, fair, or poor, but in other embodiments, other indications of accuracy may be displayed in column 1752*c*. For example, in some aspects, the column 1752*c* may display a size of a geographic region in which the corresponding access point resides. In some aspects, column 1752*c* may display center area probability information. A selection indicator 1760 indicates which of the APs in the AP list 1755 is currently selected for operation. The selection indicator 1760 is shown displayed in the scanned AP display window 1751*a* but may also be activated or displayed within the seed AP display window 1751*b* by selecting any of the access points displayed in the control 1751*b*. The button 1762*a* includes an access point selected by the selection indicator 1760 to the seed AP display window 1751*b*. The delete button 1762*b* deletes an access point from the seed AP display window 1751*b*. An OK button 1764*a* closes the user interface 1750 and any seed APs listed in the seed AP display window 1751*b* are populated in the AP list 1705. A cancel button 1764*b* exits the user interface 1750 without adding an access points to the AP list 1705.

Figure 18:
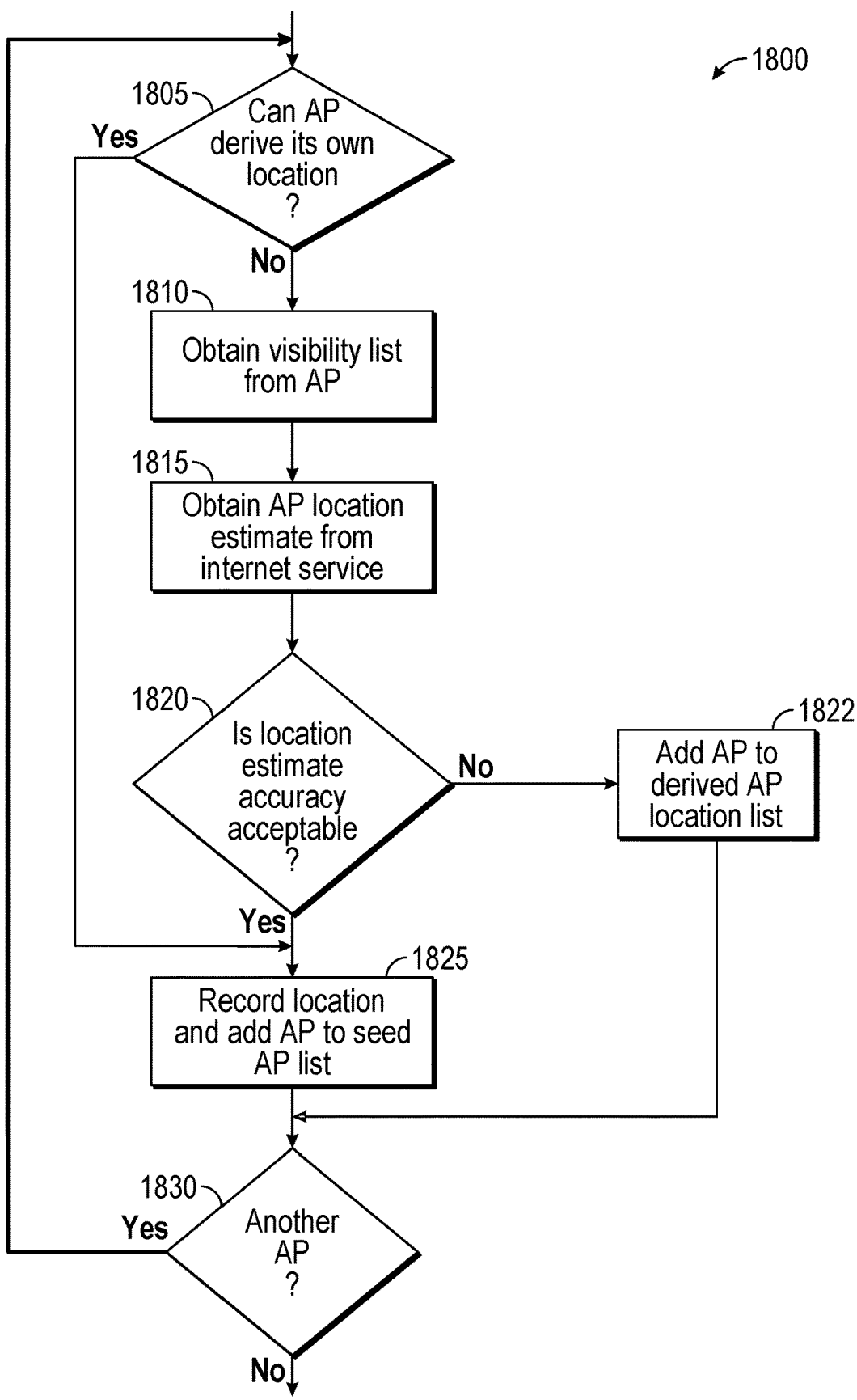
FIG. 18 is a flowchart of a method of determining a location for one or more access points.

FIG. 18 is a flowchart of a method of determining a location for one or more access points. While the user interface embodiment of FIG. 17A shows a user may select a method of determining a location of an access point via selection of a radio button 1736*a-d,* FIG. 18 contemplates a different approach, which may automatically select how best to determine a location for an access point and then determine said location in accordance with the determination. In some aspects, the process 1800 discussed below with respect to FIG. 18 may be performed by an AP cluster controller, such as the AP cluster controller 106 discussed above with respect to, for example, FIG. 1. For example, instructions 1824 may configure the processor 1802 to perform one or more of the functions discussed below. Process 1800 may iterate over one or more APs. In some aspects, the APs for iteration by process 1800 may be obtained from the AP list 1705 of FIG. 17A.

Decision operation 1805 determines whether an AP can derive its own location. For example, in some aspects, the AP cluster controller may query an access point to determine its capabilities with respect to location determination. Alternatively, in some embodiments of the user interface 1700 may provide for a configuration setting that indicates whether an AP can determine its own location. If the AP can determine its own location, the location is obtained from the AP and stored in operation 1825. The AP may be added to a list of "seed" stations. These seed stations may be utilized in operation 1710, discussed above with respect to FIG. 17A. If the AP is unable to determine its own location, a visibility list is obtained from the AP. The visibility list may include a list of devices visible from the AP. In other words, the list may identify devices from which signals have been received by the AP within a time period. In some aspects, the list may include signal strength indications for one or more of the devices identified. The visibility list obtained in operation 1810 may be similar to the list described above with respect to operation 1605. In some aspects, the visibility list may be equivalent to the information included in the station info field 610 of the message 600. In block 1815, a location estimate for the AP is obtained via an internet service. For example, some internet application providers may provide a location estimate based on a list of devices visible from the location. For example, Google® provides such a service with their geolocation API. Decision operation 1820 evaluates whether the location estimate is sufficiently accurate, or in other words, meets an accuracy criterion. In some aspects, no estimate may be provided. For example, the internet service provider may not have sufficient records on any devices visible from the AP such that a location may be estimated. Thus, in this case, the estimate is not sufficiently accurate. Alternatively, the visibility list may be too small to provide a location estimate. For example, if only a single device is visible, the location estimate may not be sufficiently accurate or not be obtainable from such little information. If the determined location is not sufficiently accurate, or not available at all, process 1800 moves from decision operation 1820 to operation 1822, which stores the AP on a list for AP's whose location needs to be further derived. Otherwise, process 1800 moves from decision operation 1820 to operation 1825, which stores the AP's location and adds the AP to a seed AP list. Seed AP's may be used to assist with derivation of other APs locations as needed, as discussed for example, above. If decision operation 1830 determines more AP's need their locations derived (e.g. more APs in the AP list 1705), processing returns to operation 1805.

Figure 19:
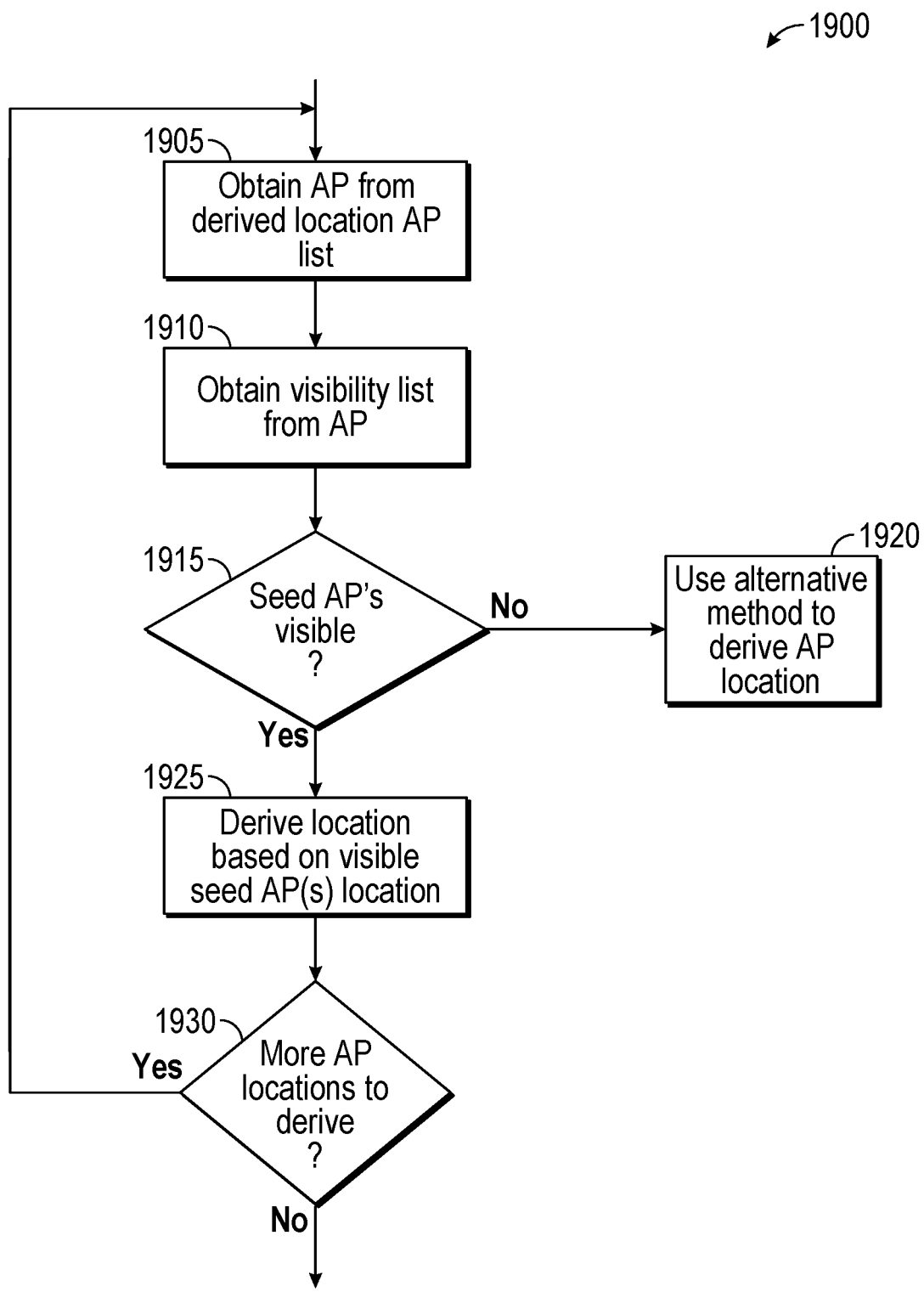
FIG. 19 is a flowchart of a method of determining a location for one or more access points.

FIG. 19 is a flowchart of a method of determining a location for one or more access points. In some aspects, process 1900, discussed below with respect to FIG. 19, may determine locations for APs identified in operation 1822 of process 1800, discussed above with respect to FIG. 18.

In some aspects, the process 1900 discussed below with respect to FIG. 19 may be performed by an AP cluster controller, such as the AP cluster controller 106 discussed above with respect to, for example, FIG. 1. For example, instructions 1924 may configure the processor 1902 to perform one or more of the functions discussed below. Process 1900 may iterate over one or more APs. In some aspects, the APs for iteration by process 1900 may be obtained from the AP list 1705 of FIG. 17A or from operation 1822.

Operation 1905 obtains an AP ("subject AP") from a derived location AP list. As discussed above, this list may be a list of APs previously determined to have an undetermined location, or a location determination of insufficient accuracy. Operation 1910 obtains a visibility list from the AP. For example, the visibility list may be similar or equivalent to the station information 610 discussed above with respect to FIG. 6 and message 600. Decision operation 1915 determines whether any seed APs are visible from the subject AP whose location is being determined. For example, as discussed above, AP's whose locations are known with sufficient specificity may be considered seed APs. The locations may be known based on, for example, a location determined by the AP itself, such as via a GPS positioning receiver, or in some cases, the AP's location may be determined via an internet service, as discussed above. If no seed APs are visible from the subject AP's whose location is being determined (i.e. the AP obtained in block 1905), process 1900 moves to operation 1920, which may use an alternate method of location determination. For example, in some aspects, block 1920 may utilize locations of one or more non-AP stations, and visibility lists and/or signal strength information relating to the subject AP to determine the subject AP's location. Alternatively, block 1920 may obtain the location of the subject AP via manual configuration. For example, user interface 1700 may provide for the manual configuration of the subject AP in some aspects. If seed AP's are visible from the subject AP, process 1900 moves to block 1925, which may derive a location of the subject AP based on locations of the seed APs. In some aspects, the seed AP's may be the "first set of access points" described in operation 1105 of process 1100, discussed above with respect to FIG. 11.

Figure 20:
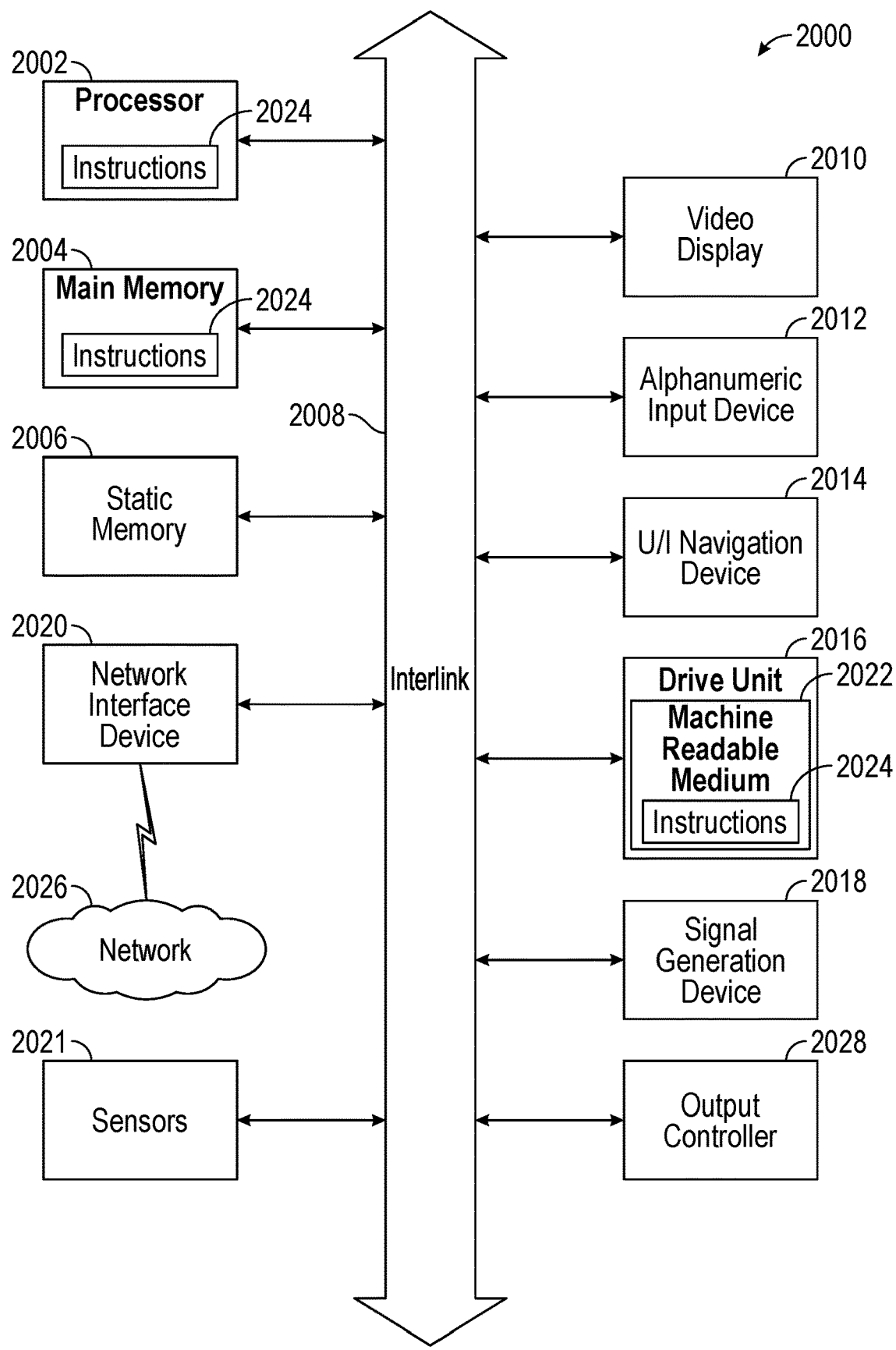
FIG. 20 illustrates a block diagram of an example machine 2000 upon which any one or more of the techniques (e.g., methodologies) discussed herein may perform.

FIG. 20 illustrates a block diagram of an example machine 2000 upon which any one or more of the techniques (e.g., methodologies) discussed herein may perform. In alternative embodiments, the machine 2000 may operate as a standalone device or may be connected (e.g., networked) to other machines. In a networked deployment, the machine 2000 may operate in the capacity of a server machine, a client machine, or both in server-client network environments. In an example, the machine 2000 may act as a peer machine in peer-to-peer (P2P) (or other distributed) network environment. The machine 2000 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. Machine 2000 may implement, in whole or in part, the any one of the mobile device 110 or 120, laptop 130, and server 115. In various embodiments, machine 2000 may perform one or more of the processes described above with respect to FIG. 11-16, 18-19, or 21-23. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2000 may include a hardware processor 2002 (e.g., a central processing unit (CPU), a graphics processing unit (GPU), a hardware processor core, or any combination thereof), a main memory 2004 and a static memory 2006, some or all of which may communicate with each other via an interlink (e.g., bus) 2008. The machine 2000 may further include a display unit 2010, an alphanumeric input device 2012 (e.g., a keyboard), and a user interface (UI) navigation device 2014 (e.g., a mouse). In an example, the display unit 2010, input device 2012 and UI navigation device 2014 may be a touch screen display. The machine 2000 may additionally include a storage device (e.g., drive unit) 2016, a signal generation device 2018 (e.g., a speaker), a network interface device 2020, and one or more sensors 2021, such as a global positioning system (GPS) sensor, compass, accelerometer, or other sensor. The machine 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2016 may include a machine readable medium 2022 on which is stored one or more sets of data structures or instructions 2024 (e.g., software) embodying or utilized by any one or more of the techniques or functions described herein. The instructions 2024 may also reside, completely or at least partially, within the main memory 2004, within static memory 2006, or within the hardware processor 2002 during execution thereof by the machine 2000. In an example, one or any combination of the hardware processor 2002, the main memory 2004, the static memory 2006, or the storage device 2016 may constitute machine readable media.

While the machine readable medium 2022 is illustrated as a single medium, the term "machine readable medium" may include a single medium or multiple media (e.g., a centralized or distributed database, and/or associated caches and servers) configured to store the one or more instructions 2024.

The term "machine readable medium" may include any medium that is capable of storing, encoding, or carrying instructions for execution by the machine 2000 and that cause the machine 2000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 2024 may further be transmitted or received over a communications network 2026 using a transmission medium via the network interface device 2020. The machine 2000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 2026. In an example, the network interface device 2020 may include a plurality of antennas to wirelessly communicate using at least one of single-input multiple-output (SIMO), multiple-input multiple-output (MIMO), or multiple-input single-output (MISO) techniques. In some examples, the network interface device 2020 may wirelessly communicate using Multiple User MIMO techniques.

Figure 21:
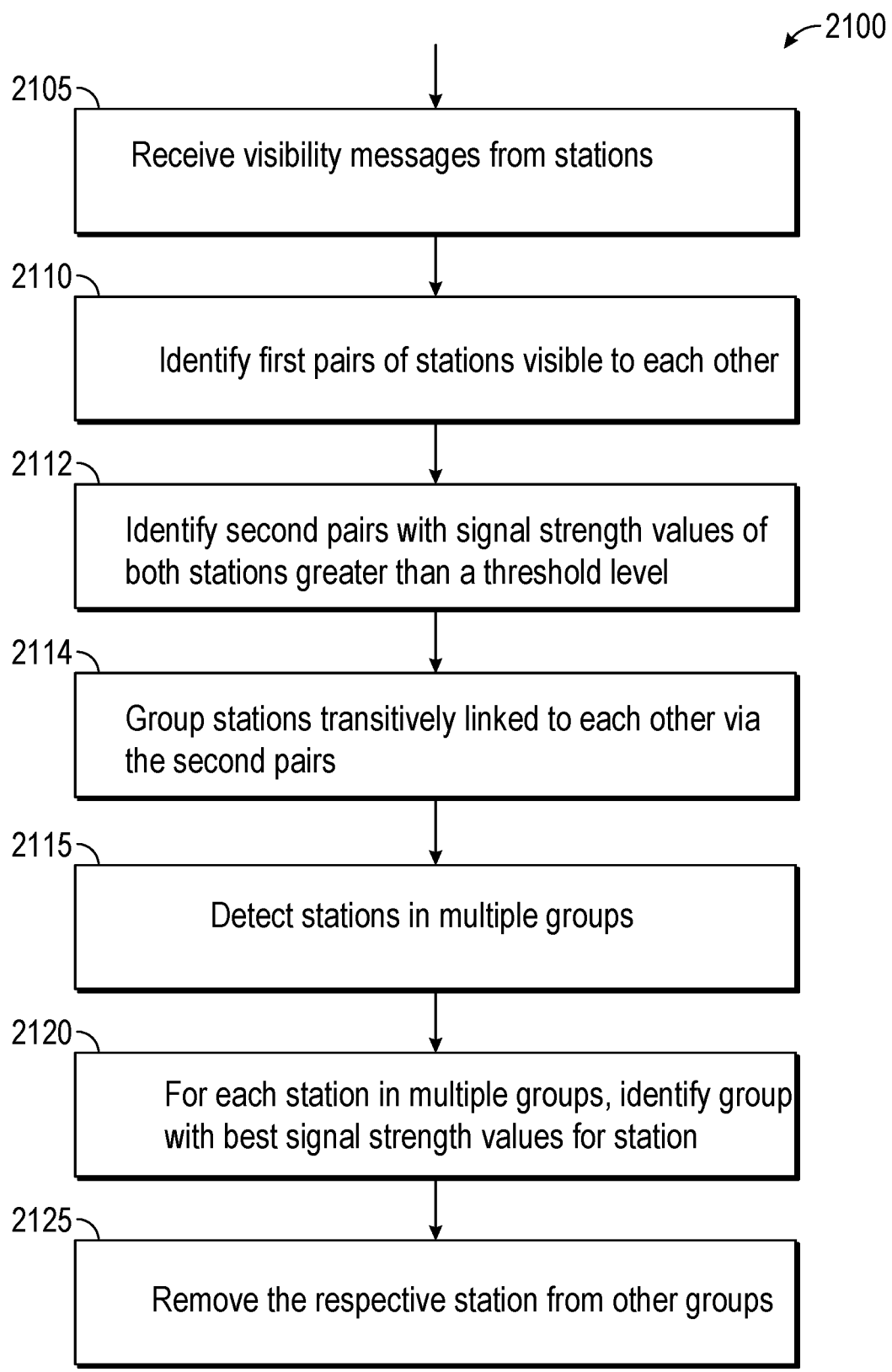
FIG. 21 is a flowchart of a method of clustering stations into groups.

FIG. 21 is a flowchart of a method of clustering stations into groups. In some aspects, one or more of the functions discussed below with respect to process 2100 of FIG. 21 may be performed by hardware processing circuitry. For example, a memory may store instructions that configure the hardware processing circuitry to perform one or more of the functions discussed below with respect to FIG. 21. In some aspects, the hardware processing circuitry may be equivalent to the processor 2002, discussed above. In some aspects, the memory may be equivalent to the memory 2005, also discussed above with respect to FIG. 20. In the discussion below, a device performing process 2100 of FIG. 21 may be referred to as an "executing device." In some aspects, one or more of the functions discussed below may be performed by the AP cluster controller 106. In some other embodiments, the executing device may be an access point, such as any of the access points 102*a*-*d*.

In operation 2105, visibility messages are received from stations. In some embodiments, each visibility message includes one or more fields of the example visibility message 600, discussed above with respect to FIG. 6. The visibility messages indicate devices from which signals are received by a device initiating or transmitting the visibility message. In some embodiments, one or more of the visibility messages also indicate a location of the device initiating the message.

In operation 2110, a first set of pairs of stations visible to each other are identified. For example, at least two visibility messages from two different stations are analyzed or parsed in operation 2110. A first of the visibility messages indicates stations visible from a first station. A second of the visibility messages indicates stations visible from a second station. If the first station is identified in the second visibility message and the second station is identified in the first visibility message, a pair is generated in operation 2110 associating the first and second stations. Some embodiments also store, in association with the pair, signal strength values (e.g. RSSI) of signals received by a first station of the pair, the signals from a second station of the pair. Signal strength value(s) of signals received by the second station of the pair for signals from the first station of the pair are also stored with the pair in some embodiments. Pairs are generated for multiple pairs of stations depending on indications within the received visibility messages of operation 2105.

In operation 2112, a second set of pairs are identified based on the first set of pairs. The second set of pairs includes only those pairs of the first set of pairs with a first signal strength value above a signal strength (e.g. RSSI) threshold value. The first signal strength value is a measurement of one or more signals from a first station in the pair as measured by a second station in the pair. In some embodiments, operation 2112 also requires a second signal strength value of the second station in the pair as measured by the first station in the pair to also be above the signal strength threshold. In this way, operation 2112 selects only those pairs of stations with relatively strong signal strength values between each other.

In operation 2114, stations transitively linked to each other via the second pairs are grouped. A station is transitively linked to another station if, for example, station A and station B are visible to each other and are represented in a first pair in the second pairs, station B and station C are visible to each other and are represented by another pair of the second pairs. Stations A and stations C are not necessarily represented by a third pair (although they could be). In this case, stations A and C are transitively linked, via station B, to each other. In this situation, each of stations A, B, and C will be grouped into a single group.

A level of transitivity between grouped stations can vary across embodiments. For example, some embodiments may provide for a limit of one level of transitivity. In this case, as discussed above, stations A, B, and C would be grouped in a common group. However, if another station D was paired with station C, but not with either station A or station B, then station D would not be included in the group with stations A, B, and C. Instead, station D would be grouped in a second group that includes stations B, and C (but not A). In embodiments grouping stations with a transitory level of two or greater, stations A, B, C, and D would be grouped in a common group.

In operation 2115, stations existing in multiple groups are identified. In the example above, a first group includes stations A, B, and C, while a second group includes stations B, C, and D. In this example, operation 2115 identifies both stations B and C as being included in each of the first and second group of stations.

In operation 2120, for each station in multiple groups, a group with a strongest average signal strength value for the respective station is identified. In some embodiments, operation 2120 identifies pairs of stations in the second pairs that include the respective station. Other stations paired with the respective station in the second pairs are then identified. In some embodiments, an average signal strength value of signals received from the respective station by the other stations is determined.

In some other embodiments, the average is computed based on a total number of stations in the group, and not just based on a number of stations receiving signals from the respective station (identified via the second pairs). Thus, in these embodiments, a station visible to a relatively smaller percentage of other stations in the group may be removed from the group, while a station with broader group visibility is maintained in the group.

In operation 2125, the respective station is removed from all groups except the group having the best signal strength metric (e.g. RSSI) as described above. After operation 2125 completes, each station is in at most a single group.

Some embodiments of process 2100 may set locations of stations within a common group to an equivalent location. In some embodiments ,some stations in a group may have known locations while other stations may not have known locations. For example, some stations may be equipped with a satellite-based positioning receiver, such as a global positioning receiver (GPS) receiver. These stations may derive their own locations independently. Some embodiments may determine a group location for stations in the group without a known location. For example, as described below, in some embodiments, known locations of stations within a group may be averaged, with the average location assigned to other stations in the group without a known location. These methods are discussed in more detail below with respect to FIG. 22.

Figure 22:
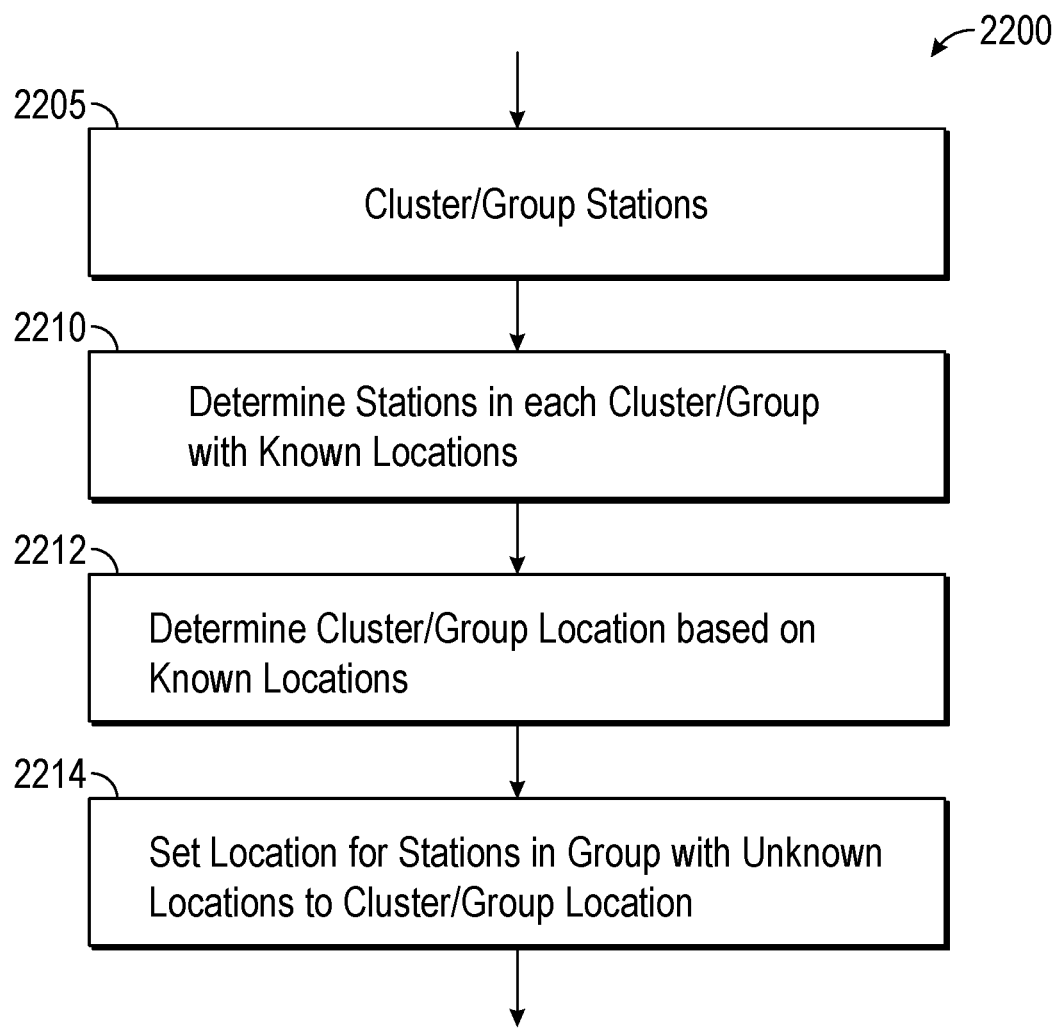
FIG. 22 is a flowchart of a method of determining a location of a station.

FIG. 22 is a flowchart of a method of determining a location of a station. In some aspects, the station is an access point. In some other aspects, the station is a non-AP station. For example, a station can include a smartphone, cell phone, laptop, desktop or other network connected device. In some aspects, one or more of the functions discussed below with respect to process 2200 of FIG. 22 may be performed by hardware processing circuitry. For example, a memory may store instructions that configure the hardware processing circuitry to perform one or more of the functions discussed below with respect to FIG. 22. In some aspects, the hardware processing circuitry may be equivalent to the processor 2002, discussed above. In some aspects, the memory may be equivalent to the memory 2005, also discussed above with respect to FIG. 20. In the discussion below, a device performing process 2200 of FIG. 22 may be referred to as an "executing device." In some aspects, one or more of the functions discussed below may be performed by the AP cluster controller 106. In some other embodiments, the executing device may be an access point, such as any of the access points 102a-d.

In operation 2205, stations are clustered or grouped. As discussed above, stations in this context may be access points, non-AP stations, or a combination of stations and access points, depending on the particular employment. In some aspects, the stations are clustered according to process 2100 discussed above with respect to FIG. 21. Other methods of clustering stations are also contemplated.

In operation 2210, stations in a particular cluster or group with known locations are determined. As discussed above, a station's location may be known using a variety of techniques. For example, a station's location can be statically configured via a user interface in some embodiments. In some other embodiments, a station, such as an access point, may be equipped with positioning equipment, such as a GPS receiver, from which a location of the station can be derived. As discussed above with respect to user interface 1700, in some embodiments, a location of a station (e.g. an AP) can be known via use of a web service, which provides a location based on other signals received by the station.

In operation 2212, a cluster or group location is determined based on the known locations of stations within the group/cluster. The cluster or group location represents a location of the group or cluster. Thus, the cluster/group location does not necessarily indicate a precise location of all stations included in a particular group/cluster, but represents an approximate location. In some embodiments, the cluster/group location is determined based on an average location of other stations in the group with known locations. An average location can be determined, in some embodiments, by averaging latitude coordinates of stations with known locations in the group/cluster. An average longitude coordinate of stations with known locations in the group/customer is also determined in these embodiments. In other embodiments, the group/cluster location is selected from a most reliable or most accurate of the known station locations within the group. For example, some methods of determining a location may be more reliable than others. A position obtained via GPS, for example, is considered more accurate or reliable than a statically configured location, in some aspects.

In operation 2214, locations for one or more stations included in the group that do not have a known location are set to the group/cluster location determined in operation 2212. In some aspects, the locations of all stations in the group are set to the group/cluster location determined in operation 2212.

In some embodiments, one or more of the locations determined according to FIGS. 21 and/or FIG. 22 may be included in a message indicating a location of a station (e.g. access point or non-AP station). For example, in some embodiments, locations determined in this manner are provided to the AP cluster controller 106. The AP cluster controller 106 in some embodiments, provides this location information to an advertising network, which may select adds for display to device associated with a particular access point, or to a station directly, based on the determined location information. In some embodiments, a non-AP station associated with an AP station assumes a location of the AP station. This location is then provided via an Hyper Text Transfer Protocol (HTTP) or other network-based communication to an advertising network. As discussed above, other embodiments may apply the location information derived by the disclosed methods for other purposes, which include, in various embodiments, locating a mobile terminal utilizing an emergency call or other telephony call service, text messages, including, in some embodiments, a text message marked for emergency use, navigation, and generation of access point and/or network component location maps. These maps may be used, in various embodiments, for connectivity planning or identifying a location based on visibility of one or more of the network components indicated by the map.

Figure 23:
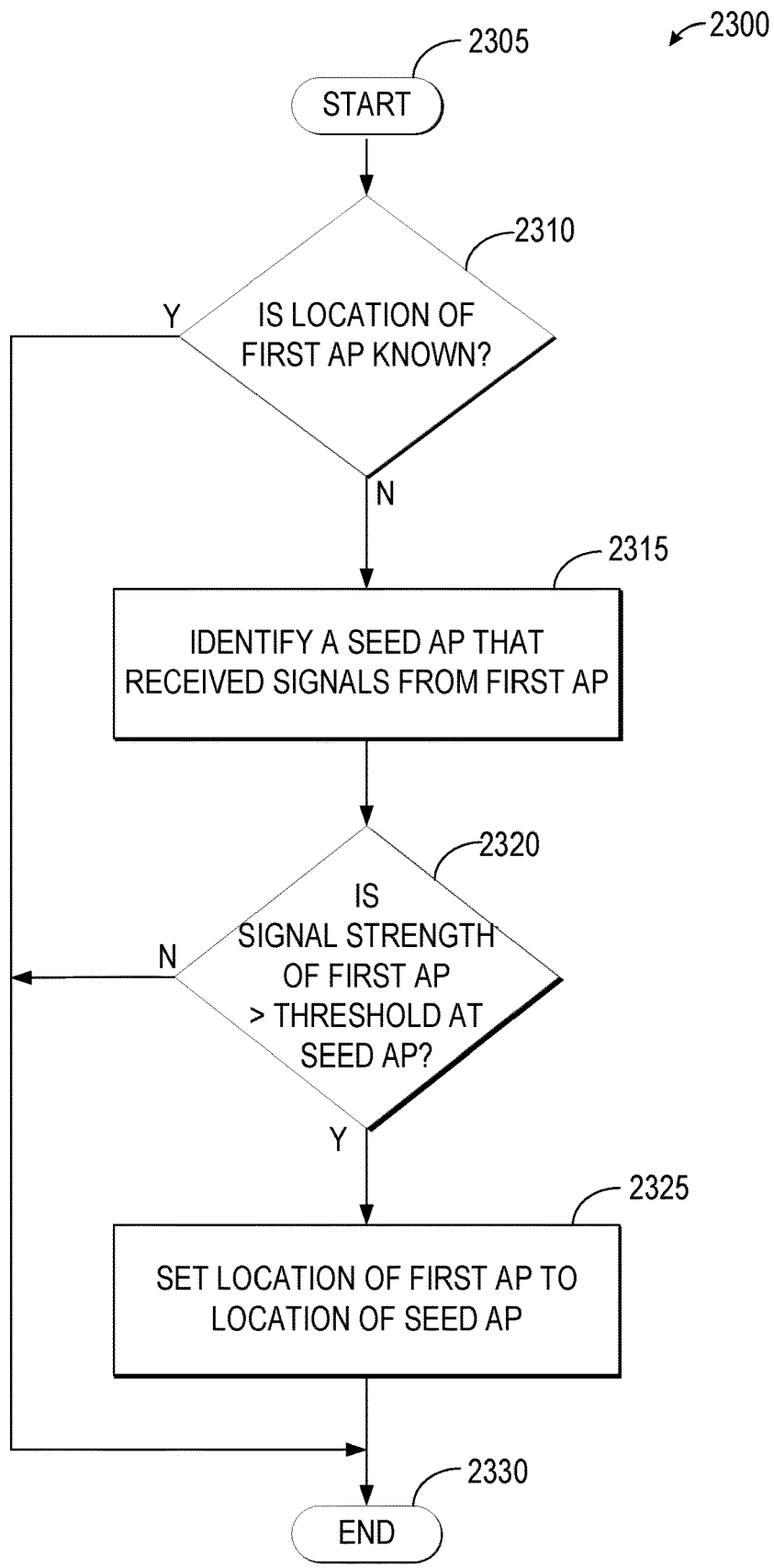
FIG. 23 is a flowchart of a method of determining a location of an access point.

FIG. 23 is a flowchart of a method of determining a location of an access point. In some aspects, one or more of the functions discussed below with respect to process 2300 of FIG. 23 may be performed by hardware processing circuitry. For example, a memory may store instructions that configure the hardware processing circuitry to perform one or more of the functions discussed below with respect to FIG. 23. In some aspects, the hardware processing circuitry may be equivalent to the processor 2002, discussed above. In some aspects, the memory may be equivalent to the memory 2005, also discussed above with respect to FIG. 20. In the discussion below, a device performing process 2300 of FIG. 23 may be referred to as an "executing device." In some aspects, one or more of the functions discussed below may be performed by the AP cluster controller 106. In some other embodiments, the executing device may be an access point, such as any of the access points 102*a*-*d*.

After start operation 2305, process 2300 moves to decision operation 2310, which evaluates a location of a first AP to determine if the location of the first AP is known. If the location is already known, process 2300 moves from decision operation 2310 to end operation 2330. Otherwise, process 2300 moves from decision operation 2310 to operation 2315, which identifies a seed access point that received signals from the first access point. In some embodiments, operation 2315 determines a seed access point from which signals have been received by the first access point.

As discussed above, a seed access point, in some embodiments, is an access point with a known location. In some cases, the location of the seed AP is known because the seed AP location is configured via a user interface, such as the user interface 1700 discussed above with respect to FIG. 17A. In some cases, the seed AP location is known because the seed AP is equipped with location determination equipment, such as a GPS receiver. Such APs may be configured to transmit their locations to other devices, such as the AP cluster controller 106, other APs, or mobile terminals associated with the AP.

In some embodiments, APs transmit visibility lists, such as those discussed above with respect to FIG. 5. The visibility lists are transmitted to the AP cluster controller 106 in at least some embodiments. In some aspects, operation 2315 relies on these visibility lists to identify one or more access points with visibility to signals transmitted by or received by the first AP. Of these access points, at least one of these access points has a known location, and therefore is considered a seed access point.

In some embodiments of decision operation 2320, the signal strength of signals received from the first AP by the seed AP identified in operation 2315 is compared to a (e.g. RSSI) threshold. In some embodiments of decision operation 2320, a signal strength of signals transmitted by the first AP as received by the seed AP is compared to the threshold. If the signal strength indication(s) (e.g. RSSI) of the signals are above the threshold, process 2320 moves to operation 2325 where a location of the first AP is set to the location of the seed AP.

This seed AP location may be used as a location for the first AP in network communications. For example, in some embodiments, the first AP sends this location to an advertising network via a network message, indicating its location to the advertising network, which may use the location to provide location relevant advertising to the first AP or to devices associated with the first AP. In some embodiments, the first AP assigns this same location to wireless devices associated with the first AP. Assigning the location includes, in some embodiments, sending the location to the associated wireless devices. In some embodiments, these wireless devices transmit the location information to an advertising network via network communication.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method of determining a location of a mobile terminal, comprising: obtaining a location of a first access point (AP); receiving a visibility indication indicating that a second AP received a signal from the first AP or the first AP received a signal from the second AP; determining a location of the second AP based on the received visibility indication and the location of the first AP; determining a location of the mobile terminal in communication with the second AP based on the determined location of the second AP; and transmitting a message indicating the location of the mobile terminal on a digital communication network.

In Example 2, the subject matter of Example 1 optionally includes wherein the visibility indication comprises a received signal strength measurement of a signal from the second AP as received by the first AP.

In Example 3, the subject matter of Example 2 optionally includes wherein determining the location of the second AP comprises comparing the received signal strength to a threshold, and setting the location of the second AP to the location of the first AP based on the comparison.

In Example 4, the subject matter of any one or more of Examples 1-3 optionally include receiving from a plurality of APs, a corresponding plurality of visibility indications of the second AP, and determining the location of the second AP based on the plurality of visibility indications.

In Example 5, the subject matter of Example 4 optionally includes wherein the corresponding plurality of visibility indications of the second AP comprise signal strength values of second AP signals received by the plurality of APs, and wherein the determination of the second location triangulates the location of the second AP based on the signal strength values.

In Example 6, the subject matter of any one or more of Examples 4-5 optionally include receiving, from each of the plurality of APs, visibility indications of multiple access points; and clustering the plurality of APs into at least two clusters based on the visibility indications, wherein the determination of the location of the second AP is based on the clustering.

In Example 7, the subject matter of Example 6 optionally includes identifying pairs of APs identifying each other, wherein the clustering is based on the pairs of APs.

In Example 8, the subject matter of any one or more of Examples 1-7 optionally include wherein the location of the first AP is obtained via input received by a user interface.

In Example 9, the subject matter of any one or more of Examples 1-8 optionally include transmitting a message indicating the second location to an advertising network.

Example 10 is a system for determining a location of a mobile terminal, comprising: hardware processing circuitry; one or more hardware memories storing instructions that when executed configure the hardware processing circuitry to perform operations comprising: obtaining a location of a first access point (AP), receiving a visibility indication indicating that a second AP received a signal from the first AP or the first AP received a signal from the second AP, determining a location of the second AP based on the received visibility indication and the location of the first AP, determining a location of the mobile terminal in communication with the second AP based on the determined location of the second AP, and transmitting a message indicating the location of the mobile terminal on a digital communication network.

In Example 11, the subject matter of Example 10 optionally includes wherein the visibility indication comprises a received signal strength measurement of a signal from the second AP as received by the first AP.

In Example 12, the subject matter of Example 11 optionally includes wherein determining the location of the second AP comprises comparing the received signal strength to a threshold, and setting the location of the second AP to the location of the first AP based on the comparison.

In Example 13, the subject matter of any one or more of Examples 10-12 optionally include the operations further comprising, receiving from a plurality of APs, a corresponding plurality of visibility indications of the second AP, and determining the location of the second AP based on the plurality of visibility indications.

In Example 14, the subject matter of Example 13 optionally includes wherein the corresponding plurality of visibility indications of the second AP comprise signal strength values of second AP signals received by the plurality of APs, and wherein the determination of the second location triangulates the location of the second AP based on the signal strength values.

In Example 15, the subject matter of any one or more of Examples 13-14 optionally include the operations further comprising: receiving, from each of the plurality of APs, visibility indications of multiple access points; and clustering the plurality of APs into at least two clusters based on the visibility indications, wherein the determination of the location of the second AP is based on the clustering.

In Example 16, the subject matter of Example 15 optionally includes the operations further comprising identifying pairs of APs identifying each other, wherein the clustering is based on the pairs of APs.

In Example 17, the subject matter of any one or more of Examples 10-16 optionally include wherein the location of the first AP is obtained via input received by a user interface.

In Example 18, the subject matter of any one or more of Examples 10-17 optionally include transmitting a message indicating the second location to an advertising network.

Example 19 is a computer readable storage medium comprising instructions that when executed configure hardware processing circuitry to perform operations comprising: obtaining a location of a first access point (AP); receiving a visibility indication indicating that a second AP received a signal from the first AP or the first AP received a signal from the second AP; determining a location of the second AP based on the received visibility indication and the location of the first AP; determining a location of the mobile terminal in communication with the second AP based on the determined location of the second AP; and transmitting a message indicating the location of the mobile terminal on a digital communication network.

In Example 20, the subject matter of Example 19 optionally includes wherein determining the location of the second AP comprises comparing a received signal strength indicated in the visibility indication to a threshold, and setting the location of the second AP to the location of the first AP based on the comparison.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code,

We claim:

1. A method of determining a location of a first computing device based upon a proximity of second and third computing devices, the method comprising:
   determining that the second and third computing device are within wireless communication range of each other based upon a receipt of a wireless message transmitted between the second and third computing devices, wherein the second computing device has a known location and the third computing device has an unknown location;
   determining that a wireless communication characteristic of the wireless message transmitted between the second and third devices meets a measurement target;
   responsive to determining that the wireless communication characteristic of the wireless message transmitted between the second and third devices meets the measurement target, assigning the known location of the second computing device as a location of the third computing device;
   determining that the first computing device is within communication range of the third computing device based upon communications between the first computing device and the third computing device; and
   responsive to determining that the first computing device is within the communication range of the third computing device, causing a location-based service to be enabled for the first computing device corresponding to the assigned location of the third computing device.

2. The method of claim 1, wherein the wireless message is a broadcast message.

3. The method of claim 1, wherein the first computing device is a wireless station and the second and third computing devices are access points.

4. The method of claim 3, wherein determining that the first computing device is within the communication range of the third computing device comprises determining that the first computing device is connected to a network through the third computing device.

5. The method of claim 1, wherein the wireless communication characteristic is a signal strength and wherein the measurement target is a threshold signal strength.

6. The method of claim 1, wherein determining that the wireless communication characteristic of the wireless message transmitted between the second and third devices meets the measurement target comprises:
   utilizing the wireless communication characteristic in a clustering algorithm, the clustering algorithm clustering the second and third computing devices based upon the wireless communication characteristic into a first cluster and clustering fourth and fifth computing devices into a second cluster, the fourth and fifth computing devices being assigned second locations different than the location of the second computing device.

7. The method of claim 1, wherein the location-based service is an emergency call.

8. The method of claim 1, wherein the location-based service comprises location-based advertising.

9. The method of claim 1, wherein determining that the second and third computing device are within a wireless communication range of each other based upon the receipt of the wireless message transmitted between the second and third computing devices comprises receiving a visibility message from the second computing device indicating that the second computing device received a wireless broadcast message from the third computing device or receiving a visibility message from the third computing device indicating that the third computing device received a wireless broadcast message from the second computing device.

10. The method of claim 1, further comprising, prior to determining that the second and third computing device are within a wireless communication range of each other based upon the receipt of the wireless message transmitted between the second and third computing devices, receiving the location of the second computing device from a user.

11. The method of claim 1, wherein one or more of the second computing device or third computing devices are mobile devices.

12. A device for determining a location of a first computing device based upon a proximity of second and third computing devices, the device comprising:
   a processor;
   a memory, storing instructions, which when executed, cause the device to perform operations comprising:
      determining that the second and third computing device are within wireless communication range of each other based upon a receipt of a wireless message transmitted between the second and third computing devices, wherein the second computing device has a known location and the third computing device has an unknown location;
      determining that a wireless communication characteristic of the wireless message transmitted between the second and third devices meets a measurement target;
      responsive to determining that the wireless communication characteristic of the wireless message transmitted between the second and third devices meets the measurement target, assigning the known location of the second computing device as a location of the third computing device;
      determining that the first computing device is within communication range of the third computing device based upon communications between the first computing device and the third computing device; and
      responsive to determining that the first computing device is within the communication range of the third computing device, causing a location-based service to be enabled for the first computing device corresponding to the assigned location of the third computing device.

13. The device of claim 12, wherein the wireless message is a broadcast message.

14. The device of claim 12, wherein the first computing device is a wireless station and the second and third computing devices are access points.

15. The device of claim 14, wherein the operations of determining that the first computing device is within the communication range of the third computing device comprises determining that the first computing device is connected to a network through the third computing device.

16. The device of claim 12, wherein the wireless communication characteristic is a signal strength and wherein the measurement target is a threshold signal strength.

17. The device of claim 12, wherein determining that the wireless communication characteristic of the wireless message transmitted between the second and third devices meets the measurement target comprises:

utilizing the wireless communication characteristic in a clustering algorithm, the clustering algorithm clustering the second and third computing devices based upon the wireless communication characteristic into a first cluster and clustering fourth and fifth computing devices into a second cluster, the fourth and fifth computing devices being assigned second locations different than the location of the second computing device.

18. A device for determining a location of a first computing device based upon a proximity of second and third computing devices, the device comprising:

means for determining that the second and third computing device are within wireless communication range of each other based upon a receipt of a wireless message transmitted between the second and third computing devices, wherein the second computing device has a known location and the third computing device has an unknown location;

means for determining that a wireless communication characteristic of the wireless message transmitted between the second and third devices meets a measurement target;

means for, responsive to determining that the wireless communication characteristic of the wireless message transmitted between the second and third devices meets the measurement target, assigning the known location of the second computing device as a location of the third computing device;

means for determining that the first computing device is within communication range of the third computing device based upon communications between the first computing device and the third computing device; and means for, responsive to determining that the first computing device is within the communication range of the third computing device, causing a location-based service to be enabled for the first computing device corresponding to the assigned location of the third computing device.

19. The device of claim 18, wherein the wireless message is a broadcast message.

20. The device of claim 18, wherein the first computing device is a wireless station and the second and third computing devices are access points.

* * * * *